(12) United States Patent
Mochizuki

(10) Patent No.: US 10,950,028 B2
(45) Date of Patent: Mar. 16, 2021

(54) INFORMATION PROCESSING APPARATUS, THREE-DIMENSIONAL MODELING SYSTEM, AND COMPUTER READABLE MEDIUM STORING INFORMATION PROCESSING PROGRAM

(71) Applicant: FUJI XEROX CO., LTD., Tokyo (JP)

(72) Inventor: Mamoru Mochizuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 500 days.

(21) Appl. No.: 15/648,572

(22) Filed: Jul. 13, 2017

(65) Prior Publication Data

US 2018/0204373 A1 Jul. 19, 2018

(30) Foreign Application Priority Data

Jan. 18, 2017 (JP) ............................. JP2017-007068

(51) Int. Cl.
*G06K 9/00* (2006.01)
*G06T 15/00* (2011.01)
(Continued)

(52) U.S. Cl.
CPC .............. *G06T 15/00* (2013.01); *B33Y 50/00* (2014.12); *B33Y 50/02* (2014.12); *G06T 7/11* (2017.01);
(Continued)

(58) Field of Classification Search
None
See application file for complete search history.

(56) References Cited

U.S. PATENT DOCUMENTS 5,663,883 A 9/1997 Thomas et al.
6,413,360 B1 7/2002 Morita et al.
(Continued)

FOREIGN PATENT DOCUMENTS

CN 103302858 9/2013
EP 3040183 7/2016
(Continued)

OTHER PUBLICATIONS

Ultimaker, "Mastering Cura", https://ultimaker.com/en/resources/21932-mastering-cura, Aug. 16, 2016 (Year: 2016).*
(Continued)

*Primary Examiner* — Randolph I Chu
(74) *Attorney, Agent, or Firm* — Fildes & Outland, P.C.

(57) ABSTRACT

An apparatus includes: a generation unit that generates plural pieces of slice data by slicing, by plural planes, a 3D model as represented by 3D data; a plane assignment unit that assigns slice images to planes so that slice images corresponding to a part of the plural pieces of slice data and slice images corresponding to another part of the plural pieces of slice data are to be formed on same set of recording media; and an output unit that generates, according to the plane assignment, image formation information that allows an image forming apparatus to form the slice images on recording media and outputs the generated image formation information to the image forming apparatus, and generates, according to the plane assignment, control data that allow a post-processing apparatus to perform post-processing for manufacture of a 3D modeled object and outputs the generated control data to the post-processing apparatus.

13 Claims, 17 Drawing Sheets

(51) Int. Cl.
*G06T 7/11* (2017.01)
*B33Y 50/02* (2015.01)
*B33Y 50/00* (2015.01)
*G03G 15/22* (2006.01)

(52) U.S. Cl.
CPC .. *G03G 15/224* (2013.01); *G06T 2207/20021* (2013.01); *G06T 2215/16* (2013.01)

(56) References Cited

U.S. PATENT DOCUMENTS

| | | | |
|---|---|---|---|
| 2004/0112523 | A1 | 6/2004 | Crom et al. |
| 2006/0124231 | A1 | 6/2006 | Nonoyama et al. |
| 2010/0253335 | A1* | 10/2010 | Grimme et al. ............. 324/309 |
| 2011/0222081 | A1 | 9/2011 | Yi et al. |
| 2013/0138234 | A1 | 5/2013 | Dufort et al. |
| 2013/0244040 | A1 | 9/2013 | Oshima |
| 2014/0257547 | A1 | 9/2014 | Bachrach et al. |
| 2016/0082657 | A1 | 3/2016 | Swartz et al. |
| 2016/0132049 | A1 | 5/2016 | Ben-Bassat et al. |
| 2016/0159012 | A1 | 6/2016 | Lee et al. |
| 2017/0165918 | A1* | 6/2017 | Yuji et al. ........... B29C 67/0088 |

FOREIGN PATENT DOCUMENTS

| | | |
|---|---|---|
| JP | H11-028768 | 2/1999 |
| JP | H11-514304 | 12/1999 |
| JP | 2000-037782 | 2/2000 |
| JP | 2006-167945 | 6/2006 |
| JP | 2010-240843 | 10/2010 |

OTHER PUBLICATIONS blog.adafruit.com("How to convert G-Code back into STL #3DThursday #3DPrinting", https://blog.adafruit.com/2015/05/21/how-to-convert-g-code-back-into-stl-3dthursday-3dprinting/ (Year: 2015).*
Palermo ("What is Laminated Object Manufacturing?", https://www.livescience.com/40310-laminated-object-manufacturing.html#:~:text=Laminated%20object%20manufacturing%20(LOM)%20is%20a%20method%20of%203D%20printing.&text=During%20the%20LOM%20process%2C%20layers,computer%2Dcontrolled%20laser%20or%20blade (Year: 2013).*
Abstract and machine translation of JP 2010-240843.
Abstract and machine translation of JP 2000-037782.
Australian Office Action, dated Aug. 1, 2018, in corresponding Australian Patent Application No. 2017232242.
Chinese Office Action, dated Feb. 25, 2020, in corresponding Chinese Patent Application No. 201710957853.8 and English translation.
Yang Wentao et al., *Dividing and Splicing of CAD Solid Models Based on STL Format*, Metalforming Machinery, Mar. 2000, pp. 48-50 and English translation.
Japan Office Action, dated Dec. 22, 2020, in corresponding Japan Patent Application No. 2017-007068 and English translation.
English language machine translation of JP H11-028768.

* cited by examiner

INFORMATION PROCESSING APPARATUS, THREE-DIMENSIONAL MODELING SYSTEM, AND COMPUTER READABLE MEDIUM STORING INFORMATION PROCESSING PROGRAM

CROSS-REFERENCE TO RELATED APPLICATIONS

This application is based on and claims priority under 35 DSC 119 from Japanese Patent Application No. 2017-007068 filed on Jan. 18, 2017.

BACKGROUND

Technical Field

The present invention relates to an information processing apparatus, a three-dimensional modeling system, and a computer readable medium storing a information processing program.

SUMMARY

According to an aspect of the invention, there is provided an information processing apparatus comprising: a generation unit that generates plural pieces of slice data by slicing, by plural planes, a 3D model as represented by 3D data; a plane assignment unit that assigns slice images to planes so that slice images corresponding to a part of the plural pieces of slice data and slice images corresponding to another part of the plural pieces of slice data will be formed on the same set of recording media; and an output unit that generates, according to the plane assignment, image formation information that allows an image forming apparatus to form the slice images on recording media and outputs the generated image formation information to the image forming apparatus, and generates, according to the plane assignment, control data that allow a post-processing apparatus to perform post-processing for manufacture of a 3D modeled object and outputs the generated control data to the post-processing apparatus.

BRIEF DESCRIPTION OF THE DRAWINGS

Exemplary embodiments of the present invention will be described in detail based on the following figures, wherein.

DESCRIPTION OF SYMBOLS

Figure 1A:
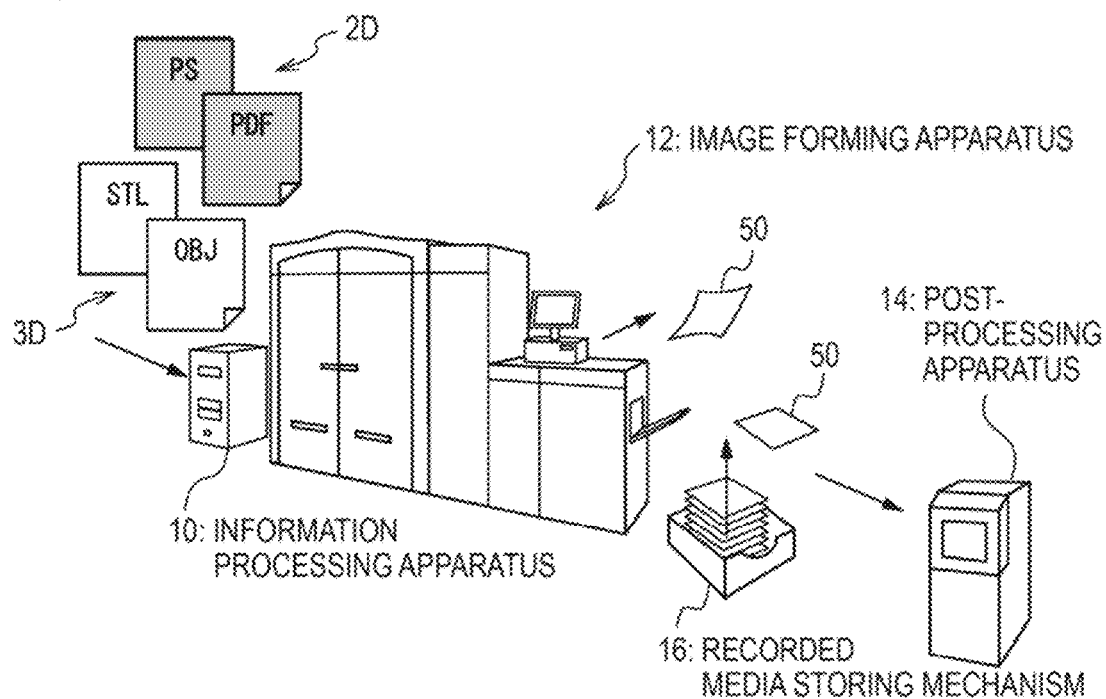
FIG. 1A is a schematic diagram illustrating an example configuration of a 3D modeling system according to an exemplary embodiment of the present invention.

10: Information processing apparatus
12: Image forming apparatus
14: 3D modeling post-processing apparatus (post-processing apparatus)
16: Recorded media storing mechanism
18: Communication line
20: Glue applying unit
22: Cutting-out unit
24: Compression bonding unit
26: Conveyance path
30: Information processing unit
40: File format conversion unit 42: Raster processing unit
44: Generation unit
45: Slice processing unit
46: Image data generation unit
47: Control data generation unit
48: Control data memory
49: Plane assignment unit
50: Recording medium
52: Lamination component
53: Unnecessary portion
54: Cutting line
56: Colored region
58: Glue application region
D: Removal target
M: 3D model
Mn: Slice image
P: 3D modeled object

DETAILED DESCRIPTION

An exemplary embodiment of the present invention will be hereinafter described in detail with reference to the drawings.
<Three-Dimensional Modeling System>
(Overall Configuration)

First, a three-dimensional (3D) modeling system according to the exemplary embodiment of the invention will be described. The 3D modeling system according to the exemplary embodiment manufactures a three-dimensional (3D) modeled object by a sheet lamination 3D modeling method. In the sheet lamination 3D modeling method, plural pieces of slice data are generated by slicing three-dimensional (3D) data of a 3D modeled object by plural surfaces and a series of slice images is formed on plural sheet-like recording media such as paper sheets on the basis of the plural pieces of slice data. Then 3D modeling post-processing is performed on the plural recording media on which the series of slice images is formed; for example, the plural recording media are laminated by subjecting them to certain processing. How to generate slice data will be described later. The term "series of slice images" means that the slice images correspond to pieces of slice data generated on the basis of the 3D data.

Figure 1B:
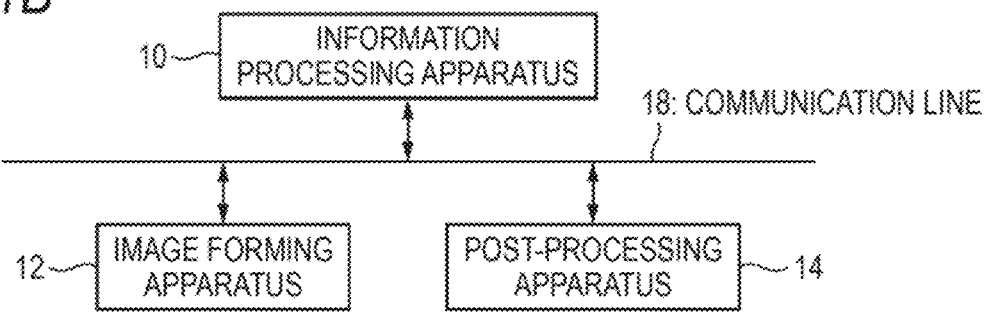
FIG. 1B is a block diagram showing the example configuration of the 3D modeling system according to the exemplary embodiment.
Figure 2:
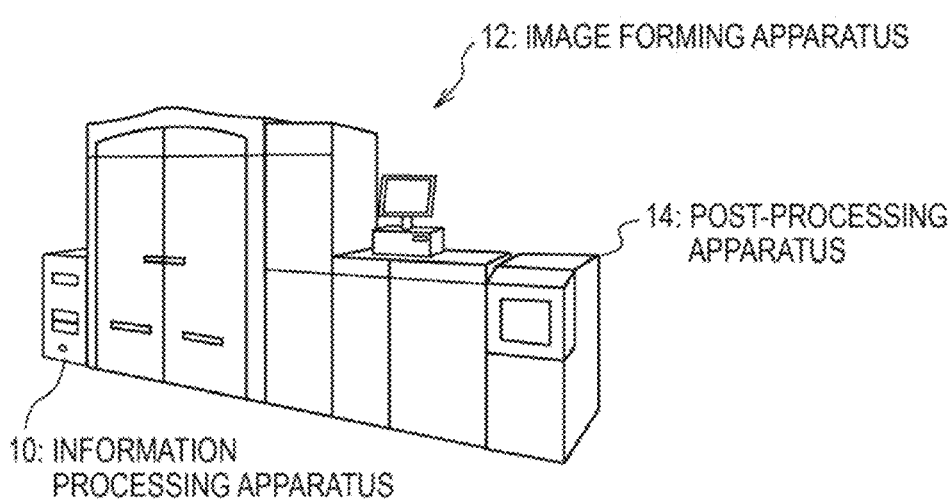
FIG. 2 is a schematic diagram showing another example configuration of the 3D modeling system according to the exemplary embodiment.

FIGS. 1A and 1B are a schematic diagram and a block diagram, respectively, illustrating an example configuration of the 3D modeling system according to the exemplary embodiment. FIG. 2 is a schematic diagram showing another example configuration of the 3D modeling system according to the exemplary embodiment.

As shown in FIG. 1A, the 3D modeling system according to the exemplary embodiment is equipped with an information processing apparatus 10, an image forming apparatus 12, and a 3D modeling post-processing apparatus 14. As shown in FIG. 1B, the information processing apparatus 10, the image forming apparatus 12, and the 3D modeling post-processing apparatus 14 are connected to each other so as to be able to communicate with each other through a communication line 18. In the following description, the 3D modeling post-processing apparatus 14 will be abbreviated as a "post-processing processing apparatus 14."

The image forming apparatus 12 forms an image on a recording medium 50 on the basis of raster image data. The raster image data is an example of the "image formation information". In the exemplary embodiment, the image forming apparatus 12 is not an apparatus dedicated to 3D modeling. The image forming apparatus 12 functions as an ordinary image forming apparatus when it is instructed to perform image formation base on two-dimensional (2D) image data. As such, the information processing apparatus 10 performs different kinds of information processing depending on which of image formation based on 2D image data and 3D modeling based on 3D data it should work for.

The image forming apparatus 12 is an apparatus for forming an image on a recording medium by electrophotography, for example. In this case, the image forming apparatus 12 includes a photoreceptor drum, a charging device, an exposing device, a developing device, a transfer device, a fusing device, etc. The charging device charges the photoreceptor drum. The exposing device exposes the charged surface of the photoreceptor drum to light that reflects an image to be formed. The developing device develops an electrostatic latent image formed on the photoreceptor drum with toner. The transfer device transfers a toner image formed on the photoreceptor drum by exposure to a recording medium. The fusing device fuses the toner image transferred to the recording medium. The image forming apparatus 12 may be an inkjet recording apparatus, in which case the image forming apparatus 12 includes an inkjet recording head for ejecting ink droplets toward a recording medium according to an image to be formed and other components.

If instructed to work for 3D modeling based on 3D data, the information processing apparatus 10 determines a lamination direction (of recording media 50) according to a preset plane assignment policy. The plane assignment policy will be described below.

The 3D modeling system according to the exemplary embodiment acquires 3D data representing a 3D model and manufactures a 3D modeled object by performing sheet lamination 3D modeling on the basis of the acquired 3D data. In doing so, the 3D modeling system generates plural pieces of slice data by slicing the 3D model as represented by the 3D data by plural planes. The 3D modeling system assigns slice images to planes so that slice images corresponding to a part of the plural pieces of slice data and slice images corresponding to another part of the plural pieces of slice data will be formed on the same set of recording media 50. The 3D modeling system generates image formation information for formation of slice images on recording media 50 and control data for 3D modeling post-processing according to the manner of plane assignment. The 3D modeling system forms slice images on sheet-like recording media 50 on the basis of the image formation information. Finally, the 3D modeling system stacks the recording media 50 bearing the slice images and performs 3D modeling post-processing on the stacked recording media 50.

In the exemplary embodiment, data indicating a plane assignment policy that was input by a user is stored in a memory 38 (described later). The 3D modeling system assigns plural pieces of slice data to planes according to the plane assignment policy.

In the exemplary embodiment, the plane assignment policy is set to one of the following two policies, that is, policy A and policy B:

Policy A: The number of recording media 50 to be used for forming one 3D modeled object should be minimized.

Policy B: The number of 3D modeled objects or modeled components that are manufactured at the same time should be maximized (this policy is directed to a case of manufacturing plural 3D modeled objects or modeled components).

In case policy A is employed, 3D data are sliced with a lamination direction set to such a direction that the number of recording media 50, that is, the number of resulting pieces of slice data, are minimized. On the other hand, in case policy B is employed, 3D data are sliced with a lamination direction set to such a direction that a maximum sectional area is minimized and resulting pieces of slice images are assigned to planes so that the number of 3D modeled objects or modeled components that are manufactured at the same time will be maximized. The term "3D modeled component" means a portion of a 3D modeled object and one of components into which the 3D modeled object is divided.

Although in the exemplary embodiment slice images are assigned to planes according to one of the above-described policy A and policy B, the invention is not limited to this case and any plane assignment policy may be employed.

Upon determination of a lamination direction, the information processing apparatus 10 generates plural pieces of slice data by slicing 3D data by slicing planes that are perpendicular to the determined lamination direction.

Then the information processing apparatus 10 generates plural slice data groups each of which consists of plural consecutive pieces of slice data according to the number of slice data, for example. The information processing apparatus 10 generates plane-assigned slice image data so that each set of slice images belonging to different slice data groups will be formed on the same recording medium 50 and generates a series of raster image data on the basis of the generated plane-assigned slice image data. The information processing apparatus 10 outputs the series of raster image data to the image forming apparatus 12.

If instructed to work for image formation based on 2D image data, the information processing apparatus 10 generates raster image data on the basis of the 2D image data and outputs the generated raster image data to the image forming apparatus 12.

If instructed to work for 3D modeling based on 3D data, the information processing apparatus 10 further generates a series of control data on the basis of the plural pieces of slice data. The series of control data is data for allowing the post-processing apparatus 14 to perform 3D modeling post-processing. As described later, element control data include control data that specify a cutting line along which to cut out a lamination component from a recording medium and control data that specify a glue application region of the recording medium where to apply glue.

Although in the exemplary embodiment the information processing apparatus 10 generates control data corresponding to plane-assigned slice image data and the post-processing apparatus 14 performs post-processing in a state that plural pieces of slice data have been subjected to plane assignment, the invention is not limited to this case. For example, another configuration is possible in which control data are generated for each slice data group and the post-processing apparatus 14 performs post-processing in units of a slice data group after the plane-assigned slice image data are divided into sets of pages (at this stage, cutting of slice images has not be performed yet).

The post-processing apparatus 14 performs 3D modeling post-processing on recording media 50 on which a series of slice linages are formed. As shown in FIG. 1A, the post-processing apparatus 14 may be disposed so as not to share a recording medium conveyance path with the image forming apparatus 12 (offline or near-line). Alternatively, as shown in FIG. 2, the post-processing apparatus 14 may be disposed so as to share a recording medium conveyance path with the image forming apparatus 12 (in-line)

Where the post-processing apparatus 14 does not to share a conveyance path with the image forming apparatus 12, plural recording media 50 on which a series of slice images are formed are stacked in order of formation of the slice images and stored in a recorded media storing mechanism 16 such as a stacker. The bundle of (i.e., stacked) plural recording media 50 is taken out of the recorded media storing mechanism 16 and transferred to the post-processing apparatus 14 together. On the other hand, where the post-processing apparatus 14 shares a conveyance path with the image forming apparatus 12, recording media 50 on which respective slice images are formed are conveyed to the post-processing apparatus 14 one by one.

(Sheet Lamination 3D Modeling)

Next, individual processes of sheet lamination 3D modeling will be described. FIGS. 3A-3D are schematic diagrams illustrating image formation processes of sheet lamination 3D modeling, and FIG. 3E is a schematic diagram illustrating a post-processing process of sheet lamination 3D modeling.

Figure 3A:
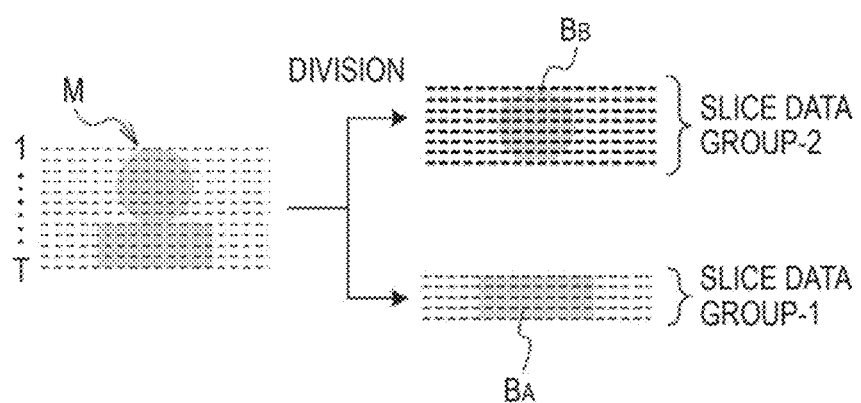
FIG. 3A is a schematic diagram illustrating a step of dividing plural pieces of slice data into plural slice data groups.

First, as shown in FIG. 3A, the information processing apparatus 10 generates plural pieces of slice data by slicing a 3D model M as represented by 3D data according to a lamination direction that is set according to a plane assignment policy. Each of the plural slice data represents a sectional image that is obtained by slicing the 3D model M by a slicing plate that is perpendicular to the lamination direction. In the exemplary embodiment, T (first to Tth) pieces of slice data are generated using T (first to Tth) slicing planes. Each of the T pieces of slice data is converted into YMCK raster image data for formation of the corresponding one of T (first to Tth) slice images.

As shown in FIG. 3A, the information processing apparatus 10 divides the generated plural pieces of slice data into plural slice data groups so that a 3D model M will produce divisional modeling components $B_A$ and $B_B$, for example. In the exemplary embodiment, to form 3D modeled objects for the respective modeling components $B_A$ and $B_B$ according to the shape of the 3D model M, the 3D model M is divided around one, with a large shape variation rate, of a series of slice images corresponding to the plural slice data. However the invention is not limited to this case.

For example, the 3D model M may be divided into N slice data groups having the same number of slice data (N: natural number that is larger than or equal to 2). This reduces the number of recording media 50 further. The term "same number" as used herein is meant to include an error that is caused by a remainder of a quotient of the number of slice data divided by the division number.

For another example, the numbers of slice data of respective slice data groups may be determined according to a maximum number of recording media 50 that can be processed by the post-processing apparatus 14 at one time. This allows the post-processing apparatus 14 to perform post-processing on a large number of recording media 50 at one time.

Figure 3B:
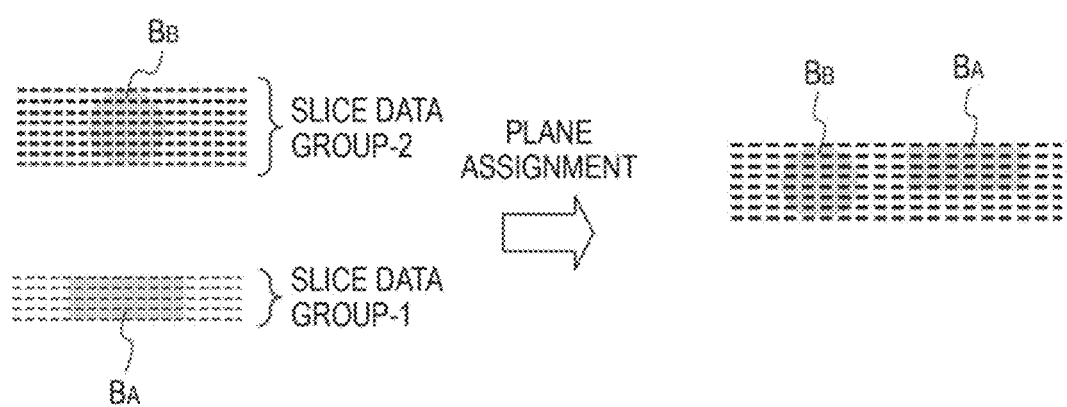
FIG. 3B is a schematic diagram illustrating a step of assigning, to planes, sets of slice images corresponding to respective sets of slice data included in different slice data groups.

Then, as shown in FIG. 3B, the information processing apparatus 10 generates a series of plane-assigned slice image data in which slice images are assigned to planes so that a set of slice images corresponding to each of sets of slice data included in the different slice data groups (e.g., the slice data group for formation of the modeling component $B_A$ and the slice data group for formation of the modeling component $B_B$) will be formed on the same recording medium 50.

Figure 3C:
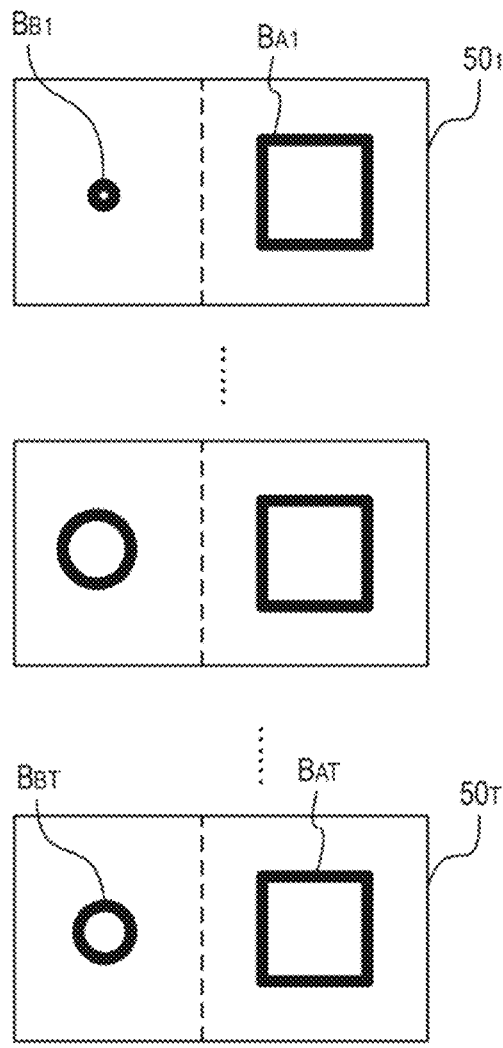
FIG. 3C is a schematic diagram showing examples of recording media to each of which slice images are assigned.

As a result, as shown in FIG. 3C, each of a series of plane-assigned slice images represented by the series of plane-assigned slice image data includes plural slice images. For example, modeling component portions $B_{A1}$ and $B_{B1}$ are formed on the same recording medium $50_1$ and modeling component portions $B_{AT}$ and $B_{BT}$ are formed on the same recording medium $50_T$.

Figure 3D:
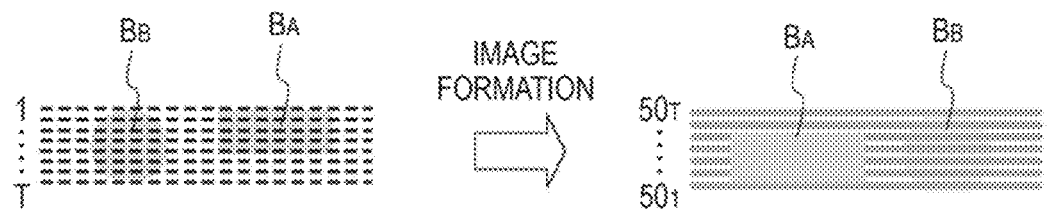
FIG. 3D is a schematic diagram illustrating a process of forming plane-assigned slice images on respective recording media.
Figure 3E:
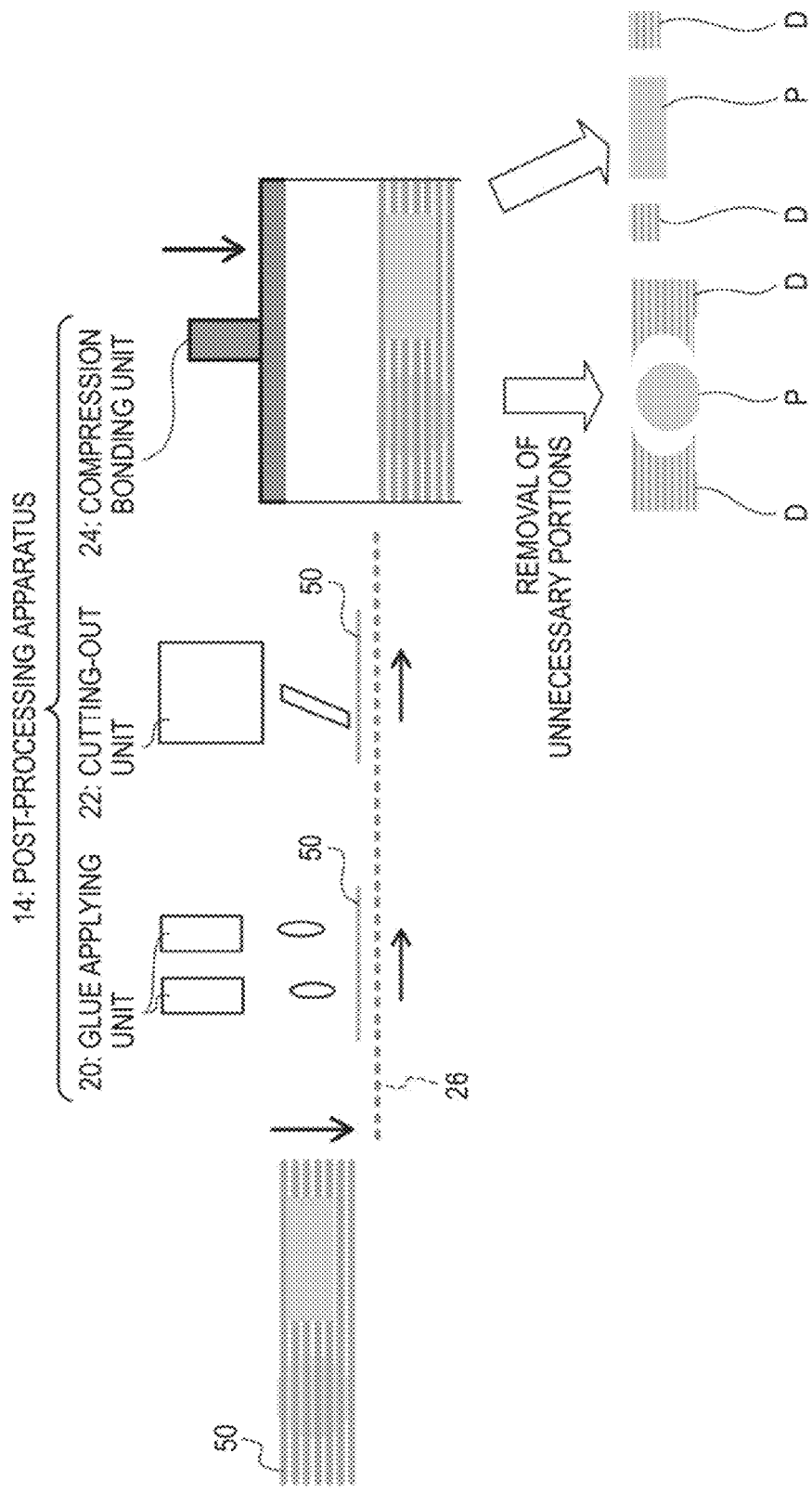
FIG. 3E is a schematic diagram illustrating how a post-processing process is executed on the recording media on which the plane-assigned slice images are formed.

Subsequently, although the details will be described later, the information processing apparatus 10 generates plural pieces of plane-assigned slice image data on the basis of 3D data of the 3D model M and generates a series of raster image data on the basis of the generated plural pieces of plane-assigned slice image data. As shown in FIG. 3D, the information processing apparatus 10 forms a series of plane-assigned slice images corresponding to the plural pieces of plane-assigned slice image data on recording media 50 on the basis of the series of raster image data. The plural recording media $50_1$ to $50_T$ on which the series of plane-assigned slice images has been formed are stacked in order of formation of the plane-assigned slice images. An nth plane-assigned slice image is formed on an nth recording medium $50_n$, where n varies from 1 to T.

In the illustrated example, the T (first to Tth) slice images are formed in order that the number representing each of them descends from to "T" to "1." The plural recording media $50_1$ to $50_T$ are stacked in the order that, the number representing each one them descends from "T" to "1" with the recording medium $50_T$ on which the Tth slice image is formed being the lowest layer. Since the plural recording media $50_1$ to $50_T$ are stacked in this order, the post-processing process that follows is supplied with the plural recording media $50_1$ to $50_T$ in order that the number representing each of them ascends from "1" to "T." As such, the image forming apparatus 12 forms T slice images on recording media 50 in the order that is reverse to the order in which the post-processing apparatus 14 performs post-processing.

Finally, as shown in FIG. 3E, the recording media 50 on which the respective slice images are formed are subjected to post processing. In the exemplary embodiment, the post-processing apparatus 14 is equipped with a glue applying unit 20 which performs a glue applying operation, a cutting-out unit 22 which performs a cutting-out operation, and a compression bonding unit 24 which performs a compression bonding operation. The glue applying unit 20, the cutting-out unit 22, and the compression bonding unit 24 are arranged in this order along a conveyance path 26 for conveying recording media 50. The post-processing apparatus 14 acquires a series of control data corresponding to the series of slice images from the information processing apparatus 10.

As described above, in the exemplary embodiment, the post-processing apparatus 14 performs post-processing in a state that sets of slice images (e.g., the slice images for formation of the modeling component $B_A$ and the slice images for formation of the modeling component $B_B$) are assigned to planes. However, the invention is not limited to this case; for example, the post-processing apparatus 14 may perform post-processing in units of a slice data group after recording media 50 have been cut so that pages assigned to and formed on the same recording medium 50 are separated from each other.

Figure 4A:
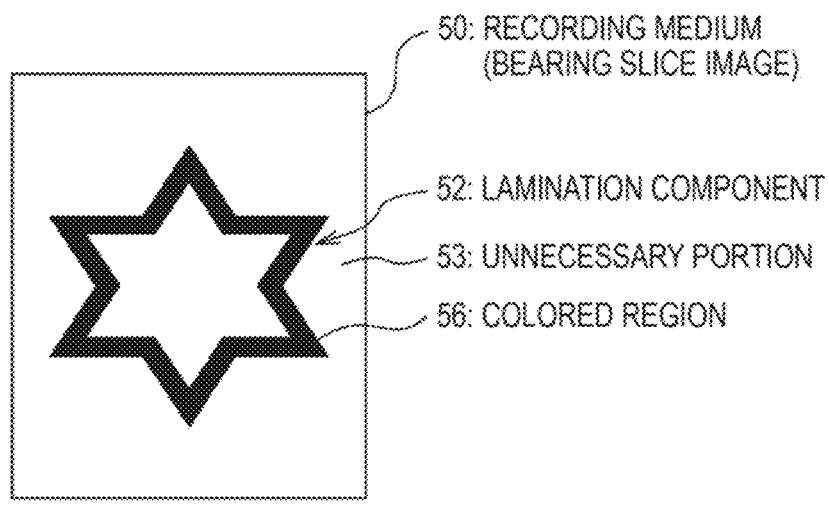
FIG. 4A is a first schematic diagram showing an example slice image formed on a recording medium.
Figure 4B:
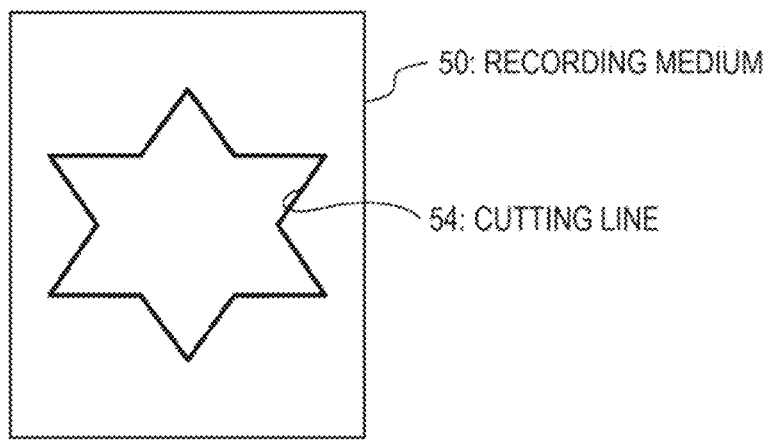
FIG. 4B is a second schematic diagram showing the example slice image formed on the recording medium.
Figure 4C:
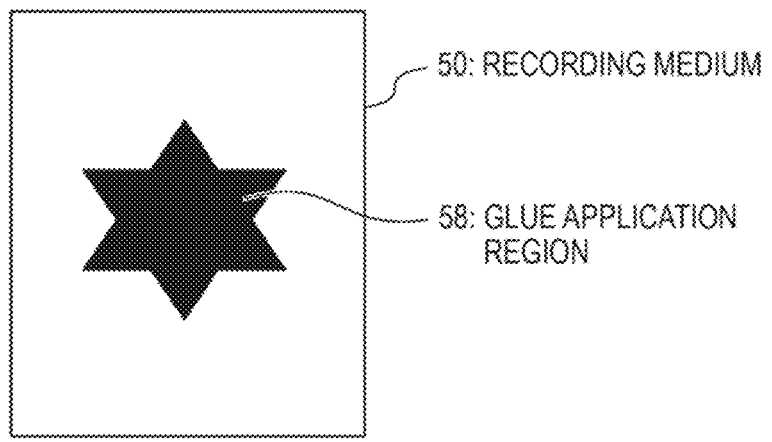
FIG. 4C is a third schematic diagram showing the example slice image formed on the recording medium.

The slice image will now be described. FIGS. 4A-4C are schematic diagrams showing an example slice image formed on a recording medium 50. As shown in FIG. 4A, a slice image formed on a recording medium 50 consists of a lamination component 52 to become part of a 3D modeled object when subjected to lamination and an unnecessary portion 53. The lamination component 52 has a colored region 56 which is a peripheral region having a preset width. As shown in FIG. 4B, the outer circumferential line of the lamination component 52 is a cutting line 54 along which to cut out the lamination component 52 from the recording medium 50.

As shown in FIG. 4C, a glue application region 58 is set inside the outer circumferential line (cutting line 54) of the lamination component 52; for example, the glue application region 58 is the region occupying the inside of the colored region 56. Although glue may be applied to the entire surface of the recording medium 50 including the unnecessary portion 53, setting the glue application region 58 as a region located inside the outer circumferential line of the lamination component 52 makes it easier to remove removal target portions D (see FIG. 3B) than in the case that glue is applied to the entire surface of the recording medium 50. Furthermore, setting the glue application region 58 as a region located inside the outer circumferential line of the lamination component 52 prevents an event that glue sticks out of the lamination component 52 in a compression bonding operation that is performed after glue application.

A width of the colored region 56 and a retreat width of the glue application region 58 from the outer circumferential line of the lamination component 52 may be set when a user inputs instructions about 3D modeling by, for example, displaying a setting picture on a display 34 of the information processing apparatus 10 and receiving settings from the user through an operation unit 32. Alternatively, preset initial settings may be employed.

Element control data include control data that specify the cutting line 54 and control data that specify the glue application region 58. For example, the control data that specify the cutting line 54 are coordinate data of points located on a route of the cutting line 54. The control data that specify the glue application region 58 are coordinate data of points in the glue application region 58.

Recording media 50 are supplied to the glue applying unit 20 one by one from a bundle of plural recording media 50. The glue applying unit 20 applies glue to the glue application region 58 of each recording medium 50 on the basis of control data that specify the glue application region 58. The glue applying unit 20 may be equipped with a glue ejection head for ejecting glue, which is moved in a lamination direction (Z direction) and directions parallel with the plane of the recording medium 50 (X and Y directions). Glue is applied to the glue application region 58 of the recording medium 50 as the glue ejection head scans the glue application region 58 while ejecting glue. Upon completion of the glue applying operation, the recording medium 50 is supplied to the cutting-out unit 22.

The cutting-out unit 22 forms a cut in each recording medium 50 along the cutting line 54 on the basis of control data that specify the cutting line 54. For example, the cutting-out unit 22 may be a cutter having a blade. The blade of the cutter is moved in the lamination direction (Z direction) and the directions parallel with the plane of the recording medium 50 (X and Y directions). A cut is formed in the recording medium 50 by moving the blade of the cutter in the X and Y directions while pressing it against the recording medium 50.

A cutting depth is determined by adjusting the position of the blade of the cutter in the lamination direction. The cutting depth may be such that the cut does not reach the back surface of each recording medium 50, in which case the lamination component 52 is not separated from the recording medium 50 and hence can be prevented from being lost in the process of conveyance of the recording medium 50.

It suffices that the cutter have a function of forming a cut along the cutting line 54 of a recording medium 50, and the cutter is not limited to a mechanical cutter that presses a blade against the recording medium 50. For example, the cutter may be an ultrasonic cutter that forms a cut by applying ultrasonic waves to a recording medium 50 or a laser cutter that forms a cut by irradiating a recording medium 50 with laser light.

Instead of forming a cut in a recording medium 50, the cutting-out unit 22 may form plural perforations in a recording medium 50 along the cutting line 54. Where plural perforations are formed, the lamination component 52 is kept connected to the recording medium 50 and hence can be prevented from being lost in the process of conveyance of the recording medium 50 even more reliably.

Each recording medium 50 that has been subjected to the cutting operation is supplied to the compression bonding unit 24. The compression bonding unit 24 stacks received recording media 50 successively. The plural recording media $50_1$ to $50_T$ are stacked in order that the number representing each of them ascends from "1" to "T." The compression bonding unit 24 compression-bonds the bundle of stacked plural recording media 50 together by pressing it in the lamination direction. During the pressure bonding, each of the plural glue-applied recording media $50_1$ to $50_T$ are bonded to the recording media 50 located immediately above and below in the glue application regions 58.

The recording media 50 that have been subjected to the cutting-out operation are composed of the lamination components 52 that constitute a 3D modeled object P as a result of the lamination and the unnecessary portions 53. In this state, the unnecessary portions 53 are not removed and remain parts of the recording media 50. The unnecessary portions 53 serve as a support member for supporting the 3D modeled object P that is a laminate of the lamination components 52. After completion of the lamination operation of the compression bonding unit 24, removal target portions D are separated from the laminate of the lamination components 52 of the recording media 50, whereby the 3D modeled object P are separated.

Figure 5A:
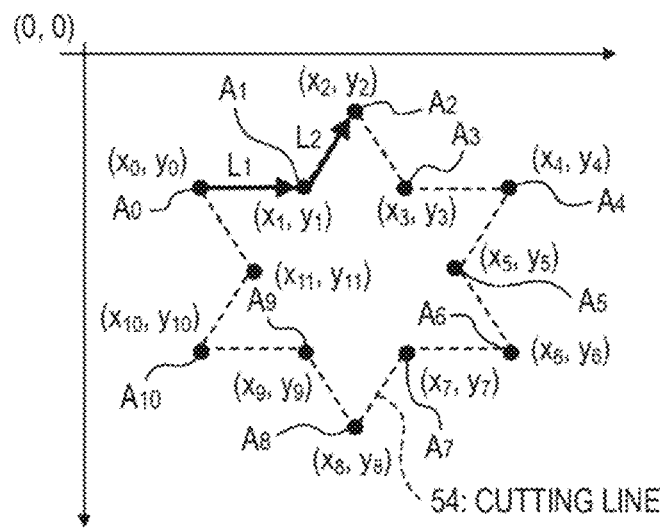
FIG. 5A is a schematic diagram illustrating an example of control data that specify a cutting line.
Figure 5B:
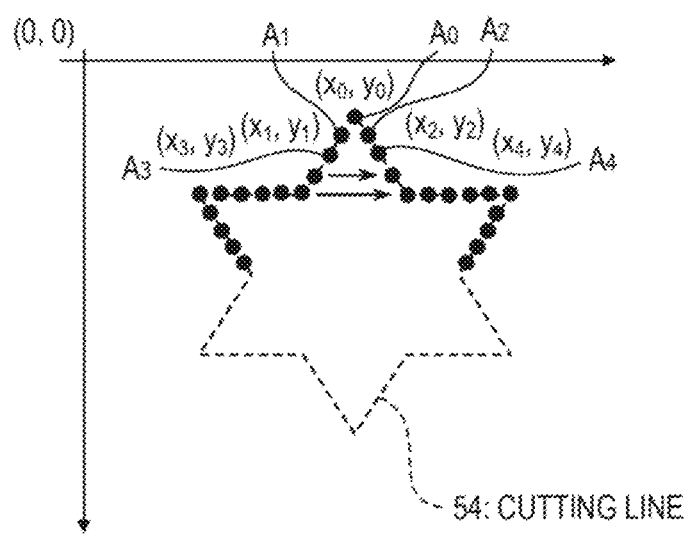
FIG. 5B is a schematic diagram illustrating another example of control data that specify the cutting line.
Figure 6A:
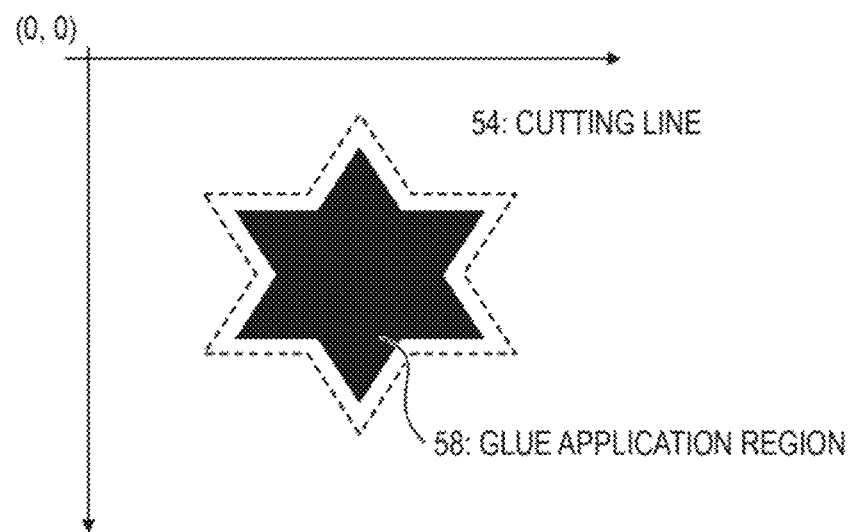
FIG. 6A is a schematic diagram illustrating an example of control data that specify a glue application region.
Figure 6B:
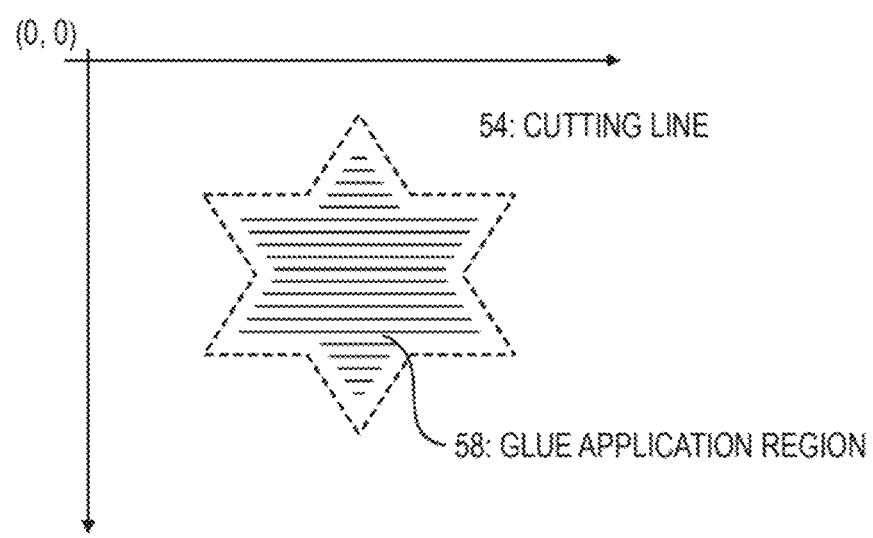
FIG. 6B is a schematic diagram illustrating another example of control data that specify the glue application region.

Next, examples of control data will be described. FIGS. 5A and 5B are schematic diagrams illustrating examples of control data that specify a cutting line 54. FIGS. 6A and 6B are schematic diagrams illustrating examples of control data that specify a glue application region 58. As described later, slice data include coordinate data of apices of an intersection regions where polygons intersect a slicing plane. The intersection regions exist along the outer circumferential line of a lamination component 52. Thus, as shown in FIG. 5A, coordinate data of respective points located on a route of a cutting line 54, such as coordinates $(x_0, y_0)$ of point $A_0$, are made control, data that, specify the cutting line 54.

In the illustrated example, a star-shaped lamination component 52 has eleven apices $A_0$ to $A_{10}$. For example, if point $A_0$ is employed as a start point, the cutting line 54 is specified by passing the points $A_0$ to $A_{10}$ in order of $A_0 \rightarrow A_2 \rightarrow A_3 \rightarrow A_4 \rightarrow A_5 \rightarrow A_6 \rightarrow A_7 \rightarrow A_8 \rightarrow A_9 \rightarrow A_{10}$.

As shown in FIG. 5B, where plural perforations are to be formed, coordinate data of respective perforations located on a route of a cutting line 54 are made control data that specify the cutting line 54. For example, if point $A_0$ is employed as a start point, the cutting line 54 is specified by passing points of the perforations in order of their formation (e.g., $A_0 \rightarrow A_2 \rightarrow A_3 \rightarrow A_4 \ldots$).

As shown in FIG. 6A, coordinate data of respective points of a glue application region 58 are made control data that specify the glue application region 58. The glue application region 58 is one size smaller than the lamination component 52 and is set inside the outer circumferential line of the lamination component 52. A glue application region 58 may be specified by reducing the image of the lamination component 52, In this case, the glue application region 58 is disposed so that its center of gravity coincides with that of the image of the lamination component 52. Coordinate data of respective points of the glue application region 58 are determined on the basis of its retreat width from the outer circumferential line of the lamination component 52 and coordinate data of points located on a route of a cutting line 54.

As shown in FIG. 6B, it is not necessary to apply glue in the entire glue application region 58. Glue may be applied in selected portions of the glue application region 58. Furthermore, the glue density need not be constant over the entire glue application region 58. Where the glue density is set variable, the glue density may be set higher in a peripheral region than in a central region.

The origin of control data that specify a cutting line 54 and the origin of control data that specify a glue application region 58 are set the same as the origin of slice image formation. Where the post-processing apparatus 14 has an image reading function, a procedure may be employed that the image forming apparatus 12 forms a mark image indicating the origin of control data on a recording medium 50 together with a slice image and the post-processing apparatus 14 acquires position information indicating the origin of control data by reading the mark image.

The form of control data is not limited to coordinate data. For example, control data may be image data in which a cutting line 54, a glue application region 58, etc. are represented by figures or images, such as binary raster image data. In the case of binary raster image data, in the example shown in FIG. 4B, the pixel values of the cutting line 54 are made "1" and those of the other regions are made "0." In the example shown in FIG. 4, the pixel values of the glue application region 58 are made "1" and those of the other regions are made "0." For example, the glue ejection head of the glue applying unit 20 ejects glue toward a recording medium 50 when the pixel value is equal to "1" and does not eject glue toward the recording medium 50 when the pixel value is equal to "0."

<Information Processing Apparatus 10>

Figure 7:
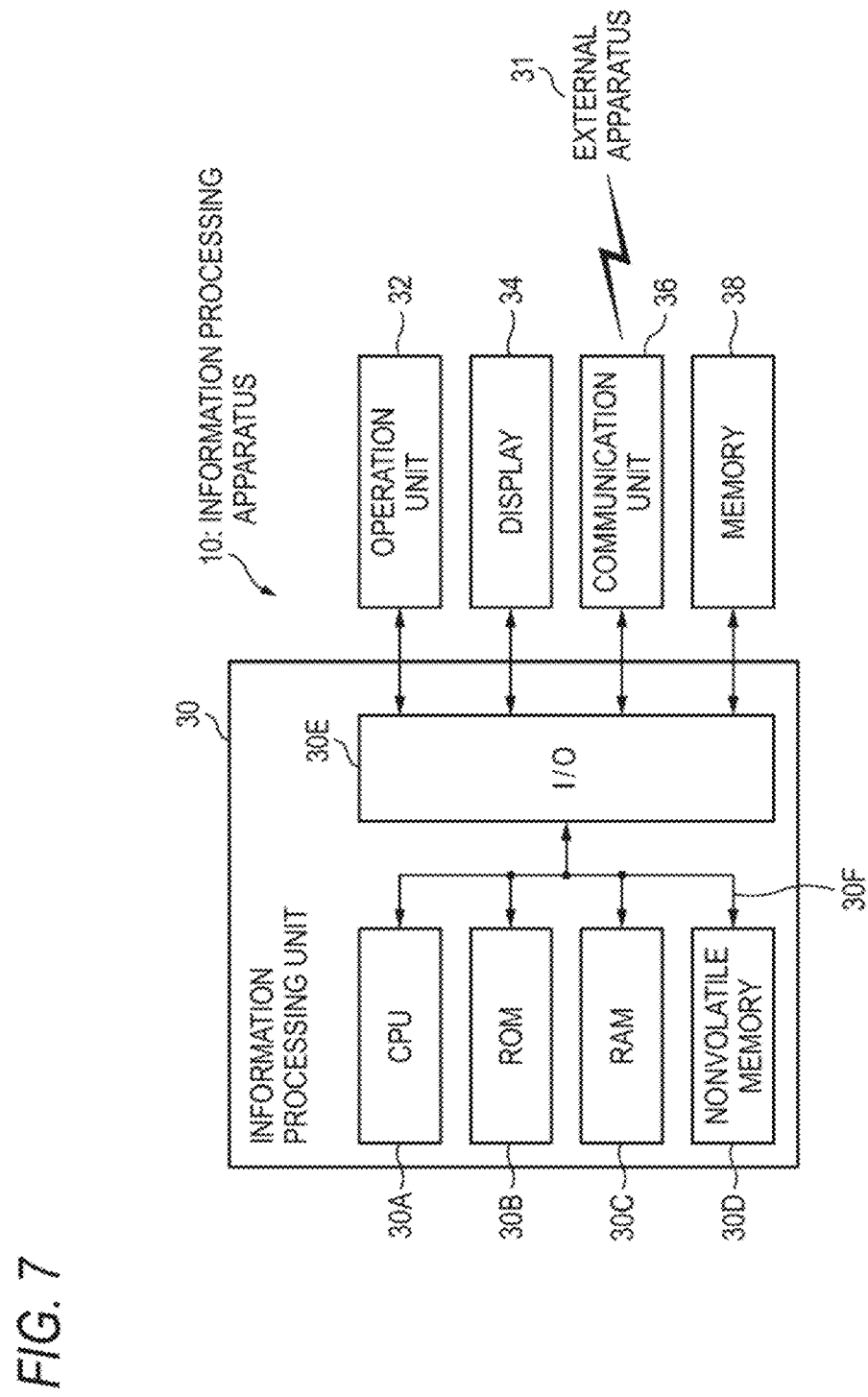
FIG. 7 is a block diagram showing an example electrical configuration of an information processing apparatus according to the exemplary embodiment.

Next, the information processing apparatus 10 according to the exemplary embodiment of the invention will be described. FIG. 7 is a block diagram showing the electrical configuration of the information processing apparatus 10 according to the exemplary embodiment. As shown in FIG. 7, the information processing apparatus 10 is equipped with an information processing unit 30, an operation unit 32 for receiving a user operation, a display 34 for displaying information to a user, a communication unit 36 for communicating with an external apparatus 31, and a memory 38 such as an external storage device. The operation unit 32, the display 34, the communication unit 36, and the memory 38 are connected to an input/output interface (I/O) 30E of the information processing unit 30.

The information processing unit 30 is equipped with a CPU (central processing unit) 30A, a ROM (read-only memory) 30B, a RAM (random access memory) 30C, a nonvolatile memory 30D, and the I/O 30E. The CPU 30A, the ROM 30B, the RAM 30C, the nonvolatile memory 30D, and the I/O 30E; are connected to each other by a bus 30F. The CPU 30A reads out a program from the ROM SOB and executes the program using the RAM 30C as a working area.

The operation unit 32 receives a user operation that is made through a mouse, a keyboard, etc. The display 34 displays various pictures to a user using a display device. The communication unit 36 communicates with the external apparatus 31 through a wired or wireless communicate line. For example, the communication unit 36 functions as an interface for communicating with 31 external apparatus 31 such as a computer that is connected to a network such as the Internet. The memory 38 is equipped with a storage device such as a hard disk drive.

Figure 8:
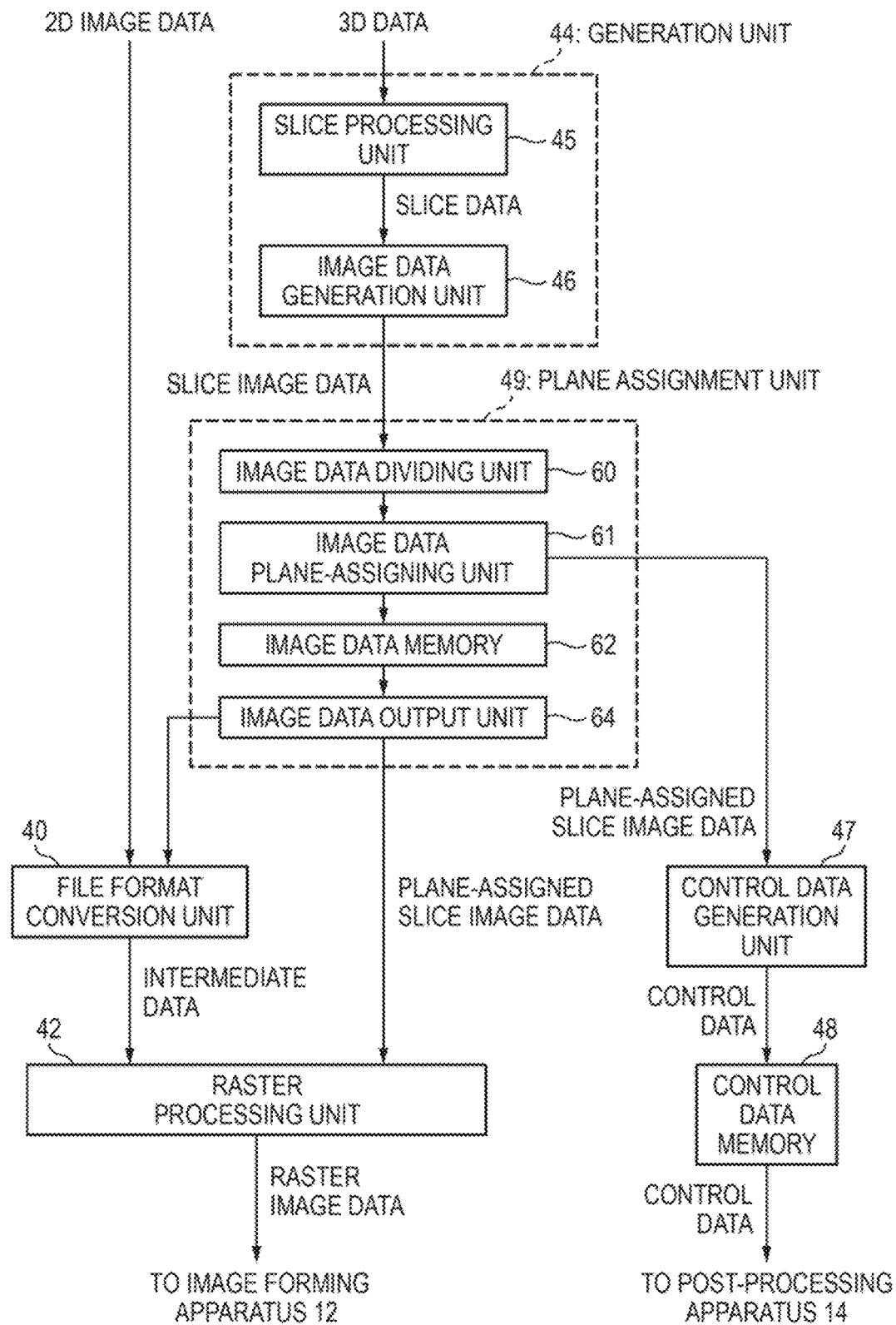
FIG. 8 is a block diagram showing an example functional configuration of the information processing apparatus according to the exemplary embodiment.

FIG. 8 is a block diagram showing the functional configuration of the information processing apparatus 10 according to the exemplary embodiment. As shown in FIG. 8, the information processing apparatus 10 is equipped with a file format conversion unit 40, a raster processing unit 42, a generation unit 44, a control data generation unit 47, a control data memory 48, and a plane assignment unit 49.

When receiving data written in a page description language (hereinafter referred to as "PDL data"), the file format conversion unit 40 converts the received PDL data into intermediate data.

The raster processing unit 42 generates raster image data toy rasterizing the intermediate data produced by the file format conversion unit 40. Furthermore, the raster processing unit 42 generates raster image data by rasterizing slice image data generated by an image data generation unit 46 (described later), The raster processing unit 42 is an example of the term "output unit" as used in the embodiment.

The generation unit 44 generates slice image data by processing received 3D data. More specifically, the generation unit 44 is equipped with a slice processing unit 45 and an image data generation unit 46. The slice processing unit 45 receives the data indicating a present plane assignment policy and 3D data, sets a lamination direction (of recording media 50) according to the preset plane assignment policy, and generates slice data on the basis of the received 3D data. The image data generation unit 46 generates slice image data on the basis of the slice data generated by the slice processing unit 45.

(2D Data Processing)

Two-dimensional data processing on 2D image data will be described below. When image formation based on 2D image data is commanded, the 2D image data are data that have been acquired as PDL data. The PDL data are converted by the file format conversion unit 40 into intermediate data, which are output to the raster processing unit 42. The intermediate data are rasterized by the raster processing unit 42 into raster image data of 2D images, which are output to the image forming apparatus 12.

The intermediate data are interval data in which objects (e.g., font characters, graphic figures, and image data) that are image elements of each page image are divided so as to correspond to respective raster scanning lines. The interval of each piece of interval data is represented by sets of coordinates of the two ends of the interval, and each piece of interval data includes information indicating pixel values of respective pixels in the interval. The data transfer rate in the information processing apparatus 10 is increased because the PDL data are converted into the intermediate data and then the latter are transferred.

(3D Data Processing)

Three-dimensional data processing on 3D data will be described below. When 3D modeling based on 3D data is commanded, 3D data of a 3D model M are acquired. The slice processing unit 45 generates slice data on the basis of the 3D data, and outputs the generated slice data to the image data generation unit 46 and the control data generation unit 47. The 3D data and the slice data will be described below in detail.

For example, the 3D data of the 3D model M are OBJ format 3D data (hereinafter referred to as "OBJ data"). In the case of OBJ data, the 3D model M is expressed as a set of polygons (triangles). Alternatively, the 3D data may be of another format such as the STL format. Since STL format 3D data have no color information, color information is added when STL format 3D data are used.

The following description will be directed to the case that the 3D data are OBJ data. The OBJ data include an OBJ file relating to shape data and an MTL file relating to color information. In the OBJ file, surface numbers specific to respective polygons (triangles), coordinate data of the apices of the polygons, etc. are defined so as to be correlated with the respective polygons. In the MTL file, pieces of color information are defined so as to be correlated with the respective polygons.

The slice processing unit 45 sets slicing planes that are parallel with a ground surface (XY plane) on which the 3D model M is placed. For example, a lowest layer of the 3D model M is set as a first slicing plane. The slice processing unit 45 generates slice data every time the slicing surface is shifted by a predetermined lamination pitch (distance) in the lamination direction (X-axis direction).

The lowest slicing plane is given a number "1" and the slicing plane number is increased by "1" every time the slicing surface is shifted. The example shown in FIG. 3A has T slicing planes having numbers "1" to "T." Slice data represent sectional images obtained by slicing the 3D model M by the slicing planes, respectively. More specifically, each piece of slice data represents a sectional image of the 3D model M in the form of a slicing plane number, coordinate data of the apices of intersection regions where polygons intersect the slicing plane, and pieces of color information that are set for the respective polygons that intersect the slicing plane. T pieces of slice data (first to Tth slice data) are generated by T respective slicing planes.

The image data generation unit 46 generates slice image data on the basis of the slice data generated by the slice processing unit 45. The slice data are converted info slice image data of a file format such as JPEG. Colored regions may be added to each slice image in generating its slice image data. The generated slice image data are output to the raster processing unit 42. The raster processing unit 42 generates raster image data by rasterizing the slice image data generated by the image data generation unit 46, and outputs the generated raster image data to the image forming apparatus 12.

Alternatively, the image data generation unit 46 may be configured so as to cause generation of intermediate data. In this case, the image data generation unit 46 generates PDL data on the basis of the slice data generated by the slice processing unit 45, and outputs the generated PDL data to the file format conversion unit 40. The file format conversion unit 40 converts the PDL data into intermediate data, and outputs the intermediate data to the raster processing unit 42. The raster processing unit 42 generates raster image data of the slice image data by rasterizing the intermediate data, and outputs the generated raster image data to the image forming apparatus 12.

The plane assignment unit 49 is equipped with an image data divining unit 60, an image data plane-assigning unit 61, an image data memory 62, and an image data output unit 64.

The image data divining unit 60 divides the series of slice image data generated by the image data generation unit 46 into plural slice data groups. The image data plane-assigning unit 61 generates a series of plane-assigned slice image data in which slice images are assigned to planes so that a set of slice images corresponding to each of sets of slice data included in the different slice data groups will be formed on the same recording medium 50. The series of plane-assigned slice image data is stored in the image data memory 62 in the forms of sets corresponding to the respective slice data groups. The image data output unit 64 reads out the series of plane-assigned slice image data from the image data memory 62, and outputs it to the raster processing unit 42.

The raster processing unit 42 generates raster image data by rasterizing the series of plane-assigned slice image data received from the image data generation unit 46, and outputs the generated raster image data to the image forming apparatus 12.

Alternatively, the image data generation unit 46 may be configured so as to cause generation of intermediate data. In this case, the image data generation unit 46 outputs PDL data (plane-assigned slice image data) to the file format conversion unit 40. The file format conversion unit 40 converts the PDL data into intermediate data, and outputs the intermediate data to the raster processing unit 42. The raster processing unit 42 generates raster image data by rasterizing the intermediate data, and outputs the generated raster image data to the image forming apparatus 12.

The control data generation unit 47 generates a series of control data on the basis of the plane-assigned slice image data generated by the image data plane-assigning unit 61. The generated series of control data is stored in the control data memory 48 so as to be correlated with respective plane-assigned slice image numbers (which are the same as the respective slicing plane numbers). The series of control data is read out from the control data memory 48 and output to the post-processing apparatus 14 upon reception of a post-processing start instruction from a user.

Although in the exemplary embodiment the information processing apparatus 10 is equipped with the control data memory 48, a storage unit for storing control data may be disposed outside the information processing apparatus 10. For example, the post-processing apparatus 14 may be equipped with a storage unit for storing control data. In this case, the control data generated by the information processing apparatus 10 are stored in the storage unit of the post-processing apparatus 14 and read out from it when used.

The storage unit for storing control data may be a computer-readable, portable storage medium such as a USB (Universal Serial Bus) memory. In this case, control data generated by the information processing apparatus 10 are stored in the computer-readable, portable storage medium. The control data stored in this storage medium are read out from it by a data, reading mechanism such as a drive provided in the information processing apparatus 10 or the post-processing apparatus 14 and used in the post-processing apparatus 14.

(Manner of Division of a Series of Slice Image Data)

Figure 9:
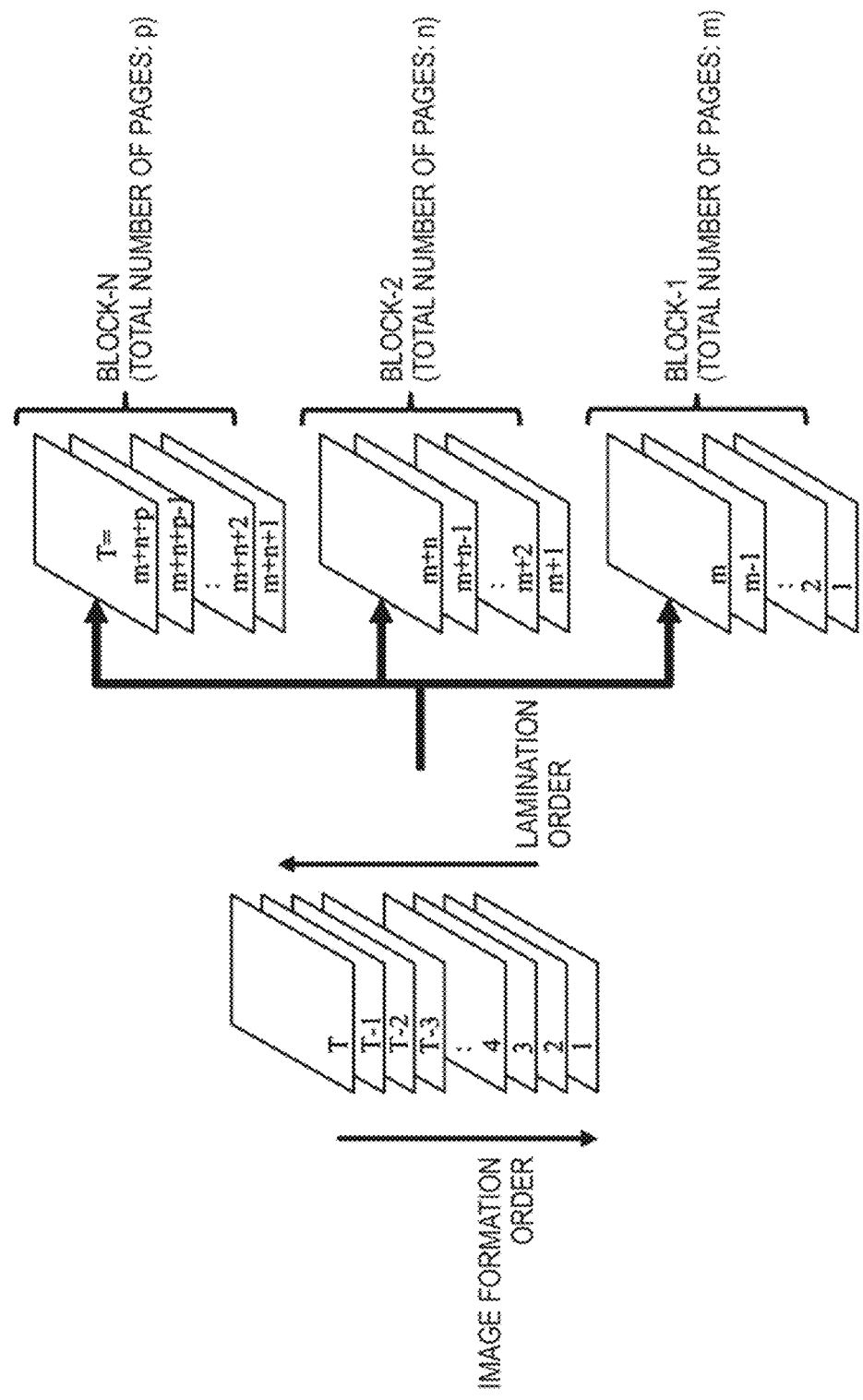
FIG. 9 is a schematic diagram illustrating an example of how a series of slice image data is divided.
Figure 10A:
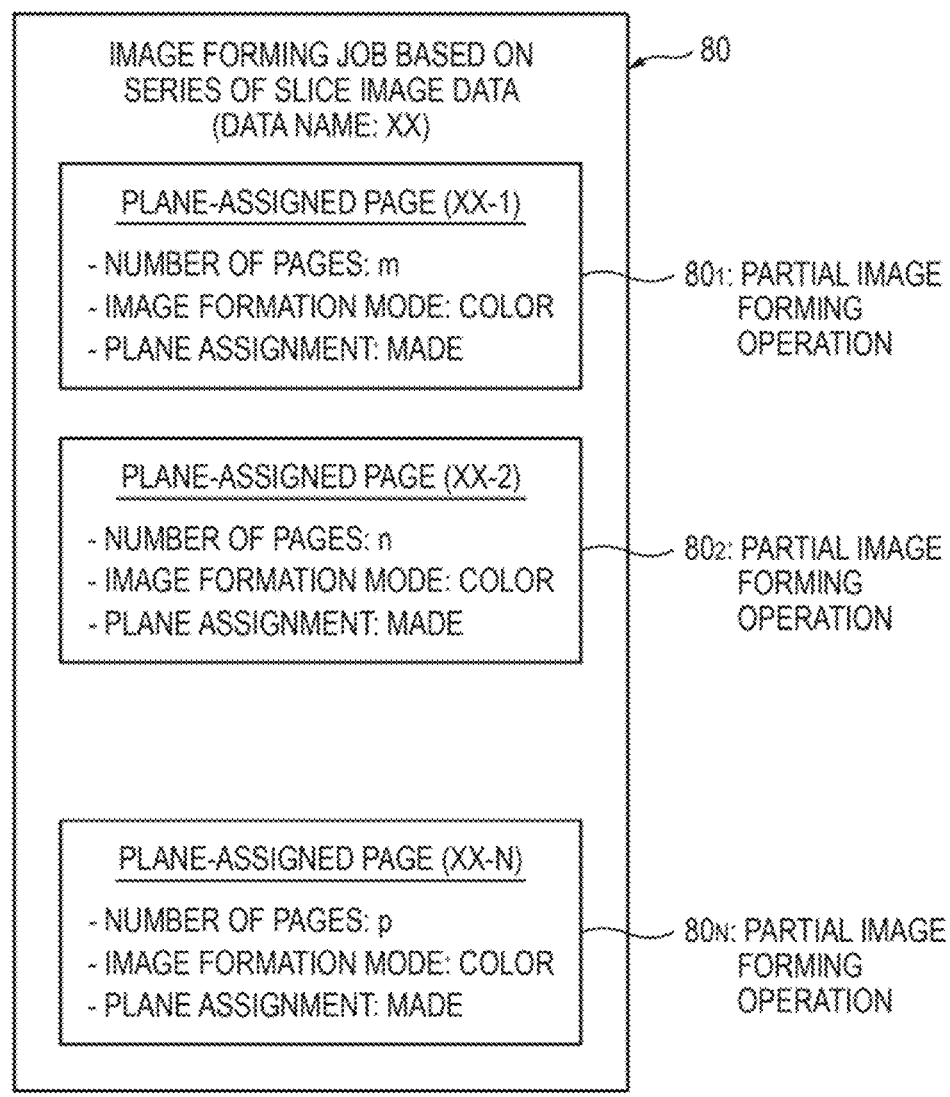
FIG. 10A is a schematic diagram illustrating an example of how image forming job is performed in a divided manner.
Figure 10B:
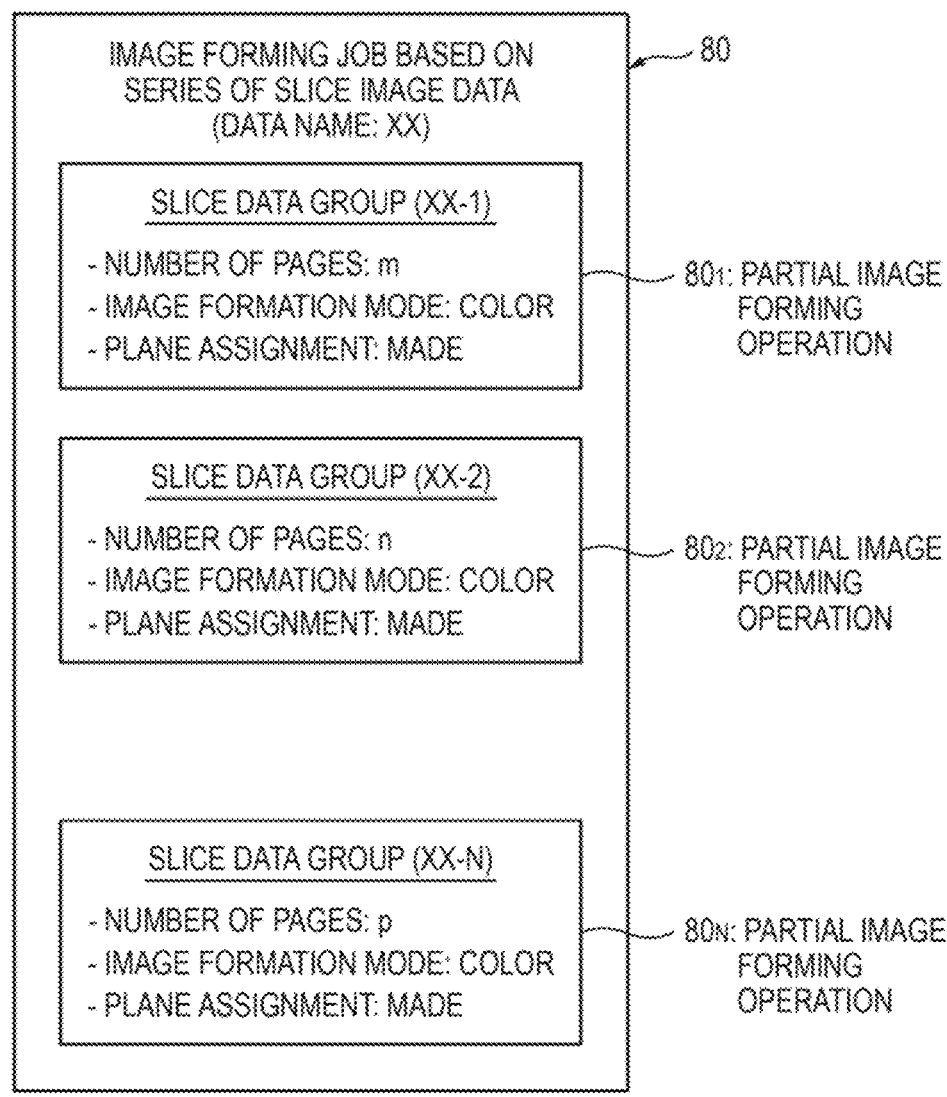
FIG. 10B is a schematic diagram illustrating another example of how an image forming job is performed in a divided manner.

Next, a description will be made of how a series of slice image data is divided. FIG. 9 is a schematic diagram illustrating an example of how a series of slice image data is divided. FIGS. 10A and 10B are schematic diagrams illustrating examples of how an image forming job is performed in a divided manner. As shown in FIG. 9, a series of slice image data is arranged in such a manner that slice images will be formed in such order as to be subjected to post-processing for 3D modeling later when formed earlier.

As shown in FIG. 9, the series of slice image data is T (first to Tth) pieces of slice image data. The T (first to Tth) slice images are formed in order that the number representing each of them descends from to "T" "1." In the post-processing process, plural recording media 50 on which the series of slice data are formed are subjected to post-processing in order that the number representing each of them ascends from "1" to "T" and hence are laminated starting from the recording media 50 on which the first slice image is formed.

The T pieces of slice image data are divided into N (first to Nth) slice data groups (N: natural number that is larger than or equal to 2), and a kth slice data group is referred to as a slice data group-k. Three slice data groups are shown in FIG. 9 (N=3) in which m (first to mth) pieces of slice image data correspond to a slice data group-1, n((m+1)th to (m+n)th) pieces of slice image data correspond to a slice data group-2, and p ((m+n+1)th to (m+n+p)th) pieces of slice image data correspond to a slice data group-N. Slice images are formed in units of a slice data group in order that the number representing each of the slice data groups ascends from to "1" to "N."

Each of the m pieces of slice image data of the slice data group-1 has page description information such as "image formation mode: color" and "plane assignment: not made." Likewise, each of the n pieces of slice image data of the slice data group-2 and each of the p pieces of slice image data of the slice data group-3 have page description information such as "image formation mode: color" and "plane assignment: not made."

Plane-assigned slice image data are generated by assigning sets of slice image data corresponding to the respective slice data groups to planes so that pieces of slice image data belonging to different slice data groups will be formed on the same recording medium 50.

As shown in FIG. 10A, an image forming job based on plane-assigned slice image data is handled as one image forming job 80 that is carried out by a single image forming apparatus. In the exemplary embodiment, the image forming job based on the plane-assigned slice image data is handled as partial image forming operations $80_1$ to $80_N$ that correspond to respective sets of plane-assigned pages.

As described above, the procedure is possible in which sets of slice images are formed on recording media 50 on the basis of plane-assigned slice image data obtained by assigning sets of slice images to planes and then post-processing is performed after cutting the recording media 50 into sets of pages. In this case, as shown in FIG. 10B, an image forming job based on plane-assigned slice image data is handled as one image forming job 80 that is carried out by a single image forming apparatus in units of a slice data group. In the exemplary embodiment, the image forming job based on the T pieces of plane-assigned slice image data is handled as N partial image forming operations $80_1$ to $80_N$ because the T pieces of plane-assigned slice image data are divided into N slice data groups.

The plural slice data groups are managed being correlated with each other using pieces of identification, information assigned to the respective slice data groups. For example, file names that are used when slice image data are stored in units of a slice data group may be used as pieces of identification information of the respective slice data groups. In the examples shown in FIGS. 10A and 10B, file names "XX-1," "XX-2," and "XX-N" of the respective slice data groups are formed by adding numbers indicating their image formation order to a file name "XX" of the entire series of slice image data. Partial image forming operations are performed by reading out the sets of slice image data of the respective slice data groups from the respective files stored.

A recording medium 50 bearing identification information of the corresponding slice data group, such as a banner sheet, may be inserted at the end of each partial image forming operation $80_1$, $80_2$, or $80_N$. This measure clarifies the boundary between adjoining ones of the partial image forming operations $80_1$, $80_2$, and $80_N$ and gives a user the identification information of a slice data group just subjected to image formation.

In the example shown in FIG. 9, the T pieces of slice image data are divided into the N slice data groups, that is, the slice data group-1 (m pages), the slice data group-2 (n pages), and the slice data group-N (p pages). The parenthesized numbers are the numbers of pieces of slice image data, belonging to the respective slice data groups. The numbers of pieces of slice image data belonging to the respective slice data groups may be either identical or different from each other. The number of pieces of slice image data is equal to the number of recording media 50 to be formed with slice images. The number of pieces of slice image data belonging to each slice data group may be a predetermined number such as the number of recording media 50 that can be housed in the recorded media storing mechanism 16.

Figure 11A:
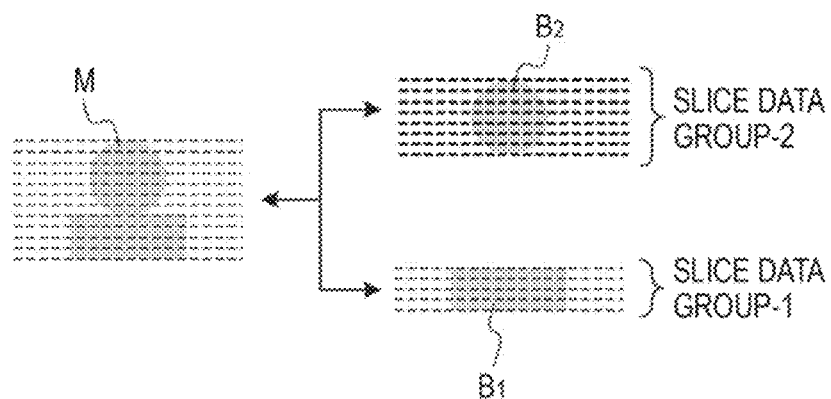
FIG. 11A is a schematic diagram illustrating another example of how a series of slice image data is divided.
Figure 11B:
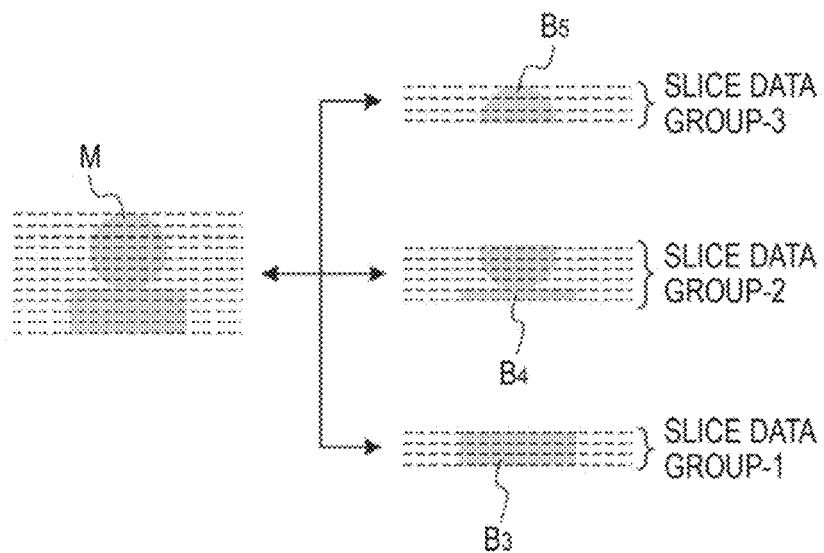
FIG. 11B is a schematic diagram illustrating a further example of how a series of slice image data is divided.

The number of pieces of slice image data belonging to each slice data group may be determined according to a shape of the 3D model M. FIGS. 11A and 11B are schematic diagrams illustrating other examples of how a series of slice image data is divided. The 3D model M is composed of 3D components $B_1$ and $B_2$. The 3D model M will be manufactured as a 3D modeled object P and the 3D components B will be manufactured as respective components of the 3D modeled object P.

In the example shown in FIG. 11A, the slice image data corresponding to the 3D component $B_1$ are called a slice data group-1 and the slice image data corresponding to the 3D component $B_2$ are called a slice data group-2. Since the boundary between the slice data group-1 and the slice data group-2 coincides with that between the 3D components $B_1$ and $B_2$, slice images are formed and subjected to post-processing in units of a 3D component B. A boundary between slice data groups may be set at a page where the number of 3D components B changes. This facilitates the recognition of the number of 3D components B.

In the example shown in FIG. 11B, each boundary between slice data groups may be set at a page where the image area of a slice image of the 3D component $B_1$ or $B_2$ is large. The series of slice image data is divided into three slice data groups, that is, a slice data group-1, a slice data group-2, and a slice data group-3. In the example, when slice images are formed and subjected to post-processing in units of a 3D component B, the bonding area of each set of adjoining components is large and hence the corresponding components of the 3D modeled object can be bonded to each other easily.

<Information Processing Program>

Figure 12:
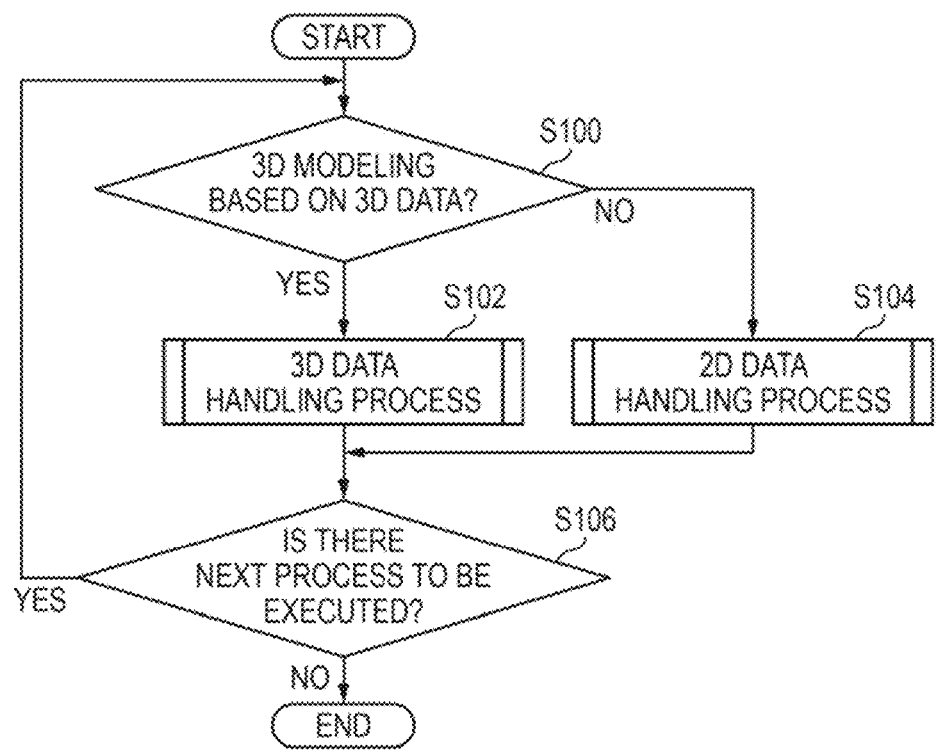
FIG. 12 is a flowchart showing an example processing procedure of an information processing program according to the exemplary embodiment.

Next, an information processing program according to the exemplary embodiment will be described. FIG. 12 is a flowchart showing an example processing procedure of the information processing program according to the exemplary embodiment. The information processing program is stored in the ROM 30B of the information processing apparatus 10. The information processing program is read out from the ROM 30B and execute by the CPU 30A of the information processing apparatus 10. Execution of the information processing program is started upon reception of an image formation instruction or a 3D modeling instruction from a user.

Although the exemplary embodiment is directed to the case that the information processing program is stored in the ROM 30B of the information processing apparatus 10 in advance, the invention is not limited to this case. For example, the information processing program may be provided being stored in a computer-readable, portable storage medium such as a magneto-optical disc, a CD-ROM (compact disc read-only memory), or a USB memory or provided over a network.

First, at step S100, the CPU 30A judges whether instruction data commands 3D modeling based on 3D data. If 3D modeling based on 3D data is commanded, the CPU 30A executes the process shown in step S102, where the CPU 30A performs the above-described 3D data processing. If 2D image formation based on 2D image data is commanded, the CPU 30A executes the process shown in step S104, where the CPU 30A performs the above-described 2D data processing.

At step S106, the CPU 30A judges whether there is a next process to be executed. If receiving an instruction to perform 2D image formation or 3D modeling during execution of the 3D data processing or 2D data processing, the CPU 30A executes the process shown in step S100 because there is a next process to be executed. If judging at step S106 that there is no next process to be executed, the CPU 30A finishes the execution of the information processing program.

<Main Operation of 3D Modeling System>

Figure 13:
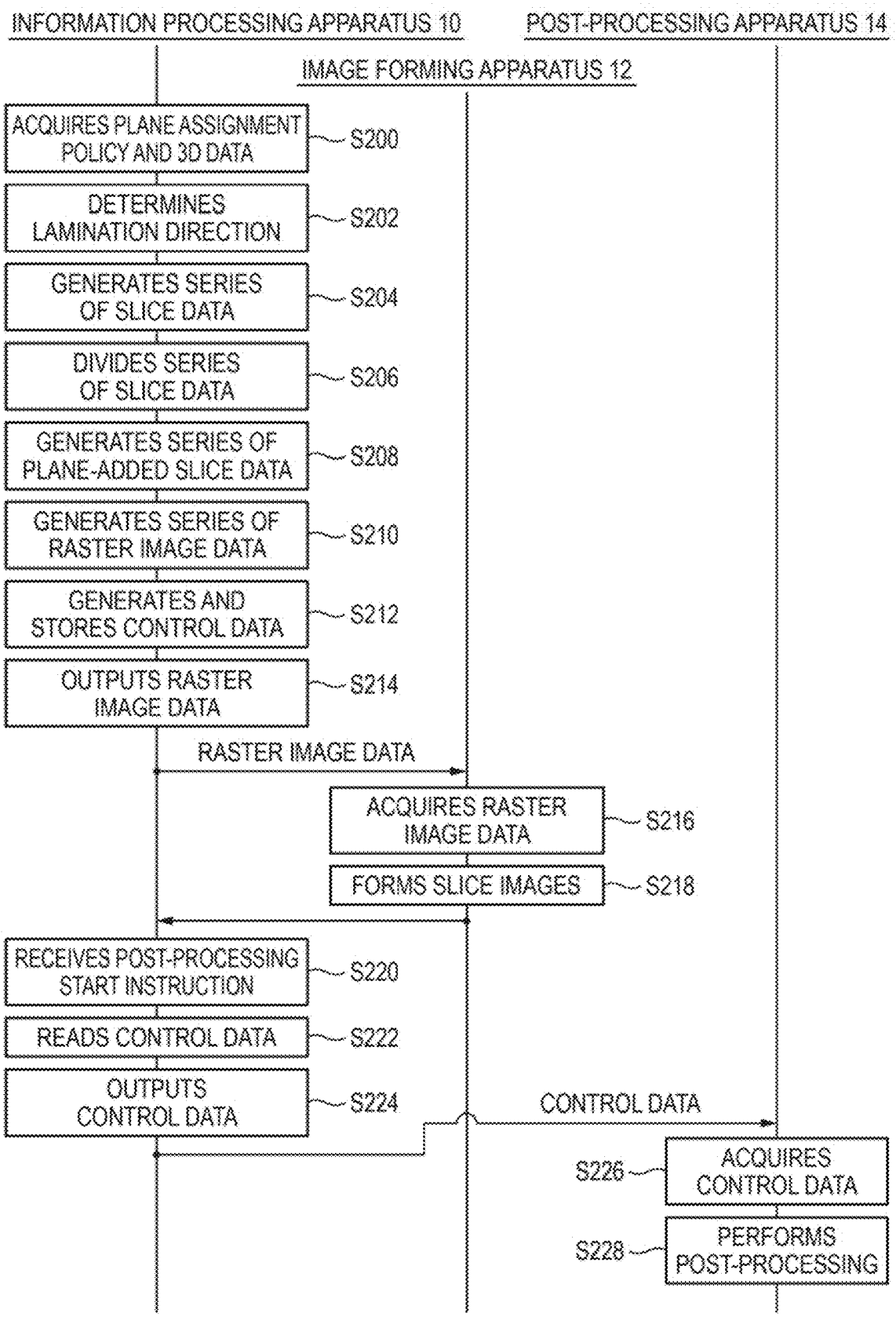
FIG. 13 is a sequence diagram illustrating a main operation of the 3D modeling system according to the exemplary embodiment.

A main operation of the 3D modeling system according to the exemplary embodiment will now be described. FIG. 13 is a sequence diagram illustrating a main operation of the 3D modeling system according to the exemplary embodiment.

As shown in FIG. 13, at step S200, the information processing apparatus 10 acquires the data indicating a preset plane assignment policy and 3D data.

Although in the exemplary embodiment the information processing apparatus 10 acquires the data indicating a preset plane assignment policy, the invention is not limited to this case. The information processing apparatus 10 may acquire data indicating a plane assignment policy by urging a user to input it.

At step S202, the information processing apparatus 10 sets a lamination direction on the basis of the preset plane assignment policy. For example, if the plane assignment policy is the above-mentioned policy-A, the information processing apparatus 10 calculates lengths of the 3D model M in the X-axis direction, the Y-axis direction, and the Z-axis direction and sets the lamination direction to a direction that provides a shortest one of the calculated lengths.

On the other hand, if the plane assignment policy is the above-mentioned policy-B, the information processing apparatus 10 calculates maximum values of sectional areas in cases that the 3D model M as represented by the 3D data is sliced with the lamination direction that is the X-axis direction, the Y-axis direction, and the S-axis direction, respectively, and sets the lamination direction to a direction that provides a smallest one of the calculated maximum values.

Although in the exemplary embodiment a lamination direction is determined according to the 3D model M as represented by the 3D data, the invention is not limited to this case. The information processing apparatus 10 may employ a lamination direction of 3D data toy urging a user to input it.

At step S204, the information processing apparatus 10 generates a series of slice data on the basis of the received 3D data. At step S206, the information processing apparatus 10 divides the series of slice data into plural slice data groups each of which is continuous slice data. For example, the information processing apparatus 10 divides the series of slice data into plural slice data groups according to the number of pieces of slice data so that each slice data group requires recording media 50 that are in such a number as to be processable by the post-processing apparatus 14.

At step S208, the information processing apparatus 10 generates a series of plane-assigned slice image data by assigning sets of slice images of the respective slice data groups to planes on the basis of the sets of slice data included in the respective slice data groups so that each set of slice images included in different slice data groups are formed on the same recording medium 50. At step S210, the information processing apparatus 10 generates a series of raster image data on the basis of the series of plane-assigned slice image data.

At step S212, the information processing apparatus 10 generates a series of control data on the basis of the series of plane-assigned slice image data and stores the generated series of control data in a storage unit.

At step S214, the information processing apparatus 10 outputs the generated series of raster image data to the image forming apparatus 12. Although in the exemplary embodiment the information processing apparatus 10 outputs the series of raster image data to the image forming apparatus 12 after generating and storing the control data, the invention is not limited to this case. The information processing apparatus 10 may output the series of raster image data to the image forming apparatus 12 before generating and storing control data.

The image forming apparatus 12 acquires the series of raster image data at step S216, and forms slice images on respective recording media 50 on the basis of the acquired series of raster image data at step S218. The plural recording media 50 on which the series of slice images has been formed are stacked in order of formation of the slice images and housed in the recorded media storing mechanism such as a stacker.

Upon receiving a post-processing start instruction from a user at step S220, the information processing apparatus 10 reads out the series of control data from the storage unit at step S222 and outputs the read-out series of control data to the post-processing apparatus 14 at step S224.

The post-processing apparatus 14 acquires the series of control data at step S226, and, at step S228, performs post-processing on the plural recording media 50 on which the respective slice images are formed.

A bundle of recording media 50 on which the series of slice images is formed and that are stacked in order of their formation is set in the post-processing apparatus 14. The post-processing apparatus 14 performs post-processing while taking out the recording media 50 one by one from the top in their stacking direction. That is, the plural recording media 50 are subjected to glue application and cutting-out processing and then stacked on each other. The plural stacked recording media 50 are subjected to compression bonding. Finally, removal target portions D are removed, whereby a 3D modeled object P is obtained (see FIG. 3B).

If post-processing were started in the midst of formation of a series of slice images, the order of post-processing on recording media 50 would become erroneous. To perform post-processing in correct order from the top of stacked recording media 50, an appropriate operation is to start post-processing after completion of formation of a series of slice images. This makes it easier to correlate the slice images with the control data than in a case that post-processing is started in the midst of formation of a series of slice images.

In the image forming apparatus 12, high-speed processing of several hundred pages per minute, for example, is possible. On the other hand, the processing speed (lamination rate) of the post-processing apparatus 14 is as very low as about several millimeters per hour. Thus, the processing speed of the overall process to manufacture of a 3D modeled object is limited by the processing speed of the post-processing apparatus 14. If control data are generated according to the processing speed of the post-processing apparatus 14, the information processing apparatus 10 cannot perform other processing such as rasterization of 2D image data during the generation of control data. This means reduction of the processing ability of the image forming apparatus 12.

In contrast, in the exemplary embodiment, a series of control data is stored in the storage unit and can be read out from it in performing post-processing. As a result, the process of forming slice images on recording media 50 and the process that the post-processing apparatus 14 performs 3D modeling post-processing on the recording media 50 can be isolated from each other. Thus, the processing ability of each apparatus is made higher than in the case that a series of control data is not stored in a storage unit.

The information processing apparatus 10 generates control data irrespective of post-processing of the post-processing apparatus 14. The image forming apparatus 12 forms slice images on respective recording media 50 irrespective of post-processing of the post-processing apparatus 14. Alternatively, the image forming apparatus 12 may perform another kind of image forming job before a start of post-processing on recording media 50 that are formed with slice images. That is, the image forming apparatus 12 may be an ordinary image forming apparatus that performs image formation on the basis of 2D image data rather than an image forming apparatus dedicated to 3D modeling. Furthermore, the post-processing apparatus 14 performs post-processing irrespective of slice image formation processing of the image forming apparatus 12.

Figure 14:
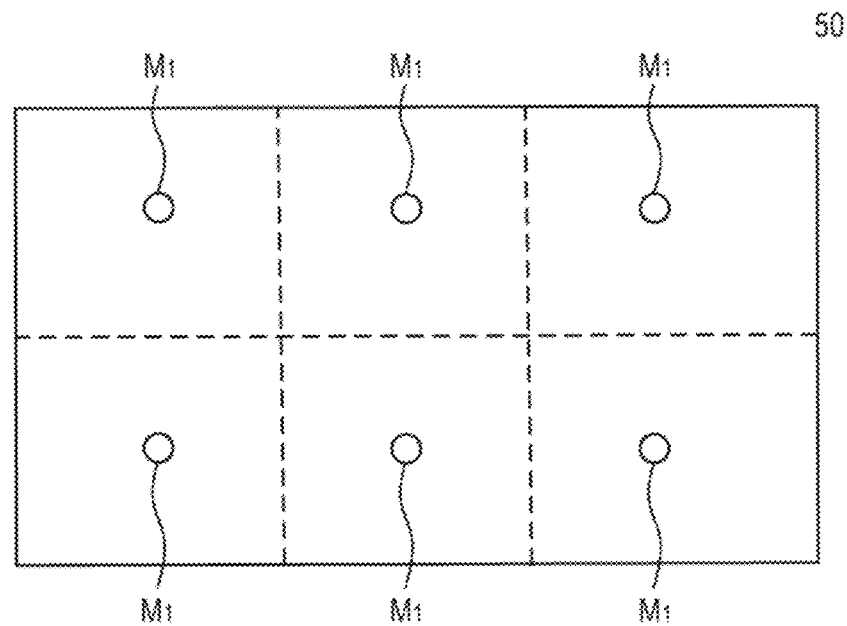
FIG. 14 illustrates another example of how slice images are formed on a recording medium.

Although in the exemplary embodiment one series of 3D data is divided into plural slice data groups and plane assignment is done so that each set of slice images included in different slice data groups will be formed on the same recording medium 50, the invention is not limited to this case. For example, as shown in FIG. 14, in manufacturing 3D modeled objects of plural 3D models that are represented by the same 3D data, plane assignment may be done so that slice images $M_1$ corresponding to slice data of the same 3D data will be formed on each of the same recording media 50. In this case, plural 3D modeled products represented by the same 3D data are manufactured at the same time.

Figure 15:
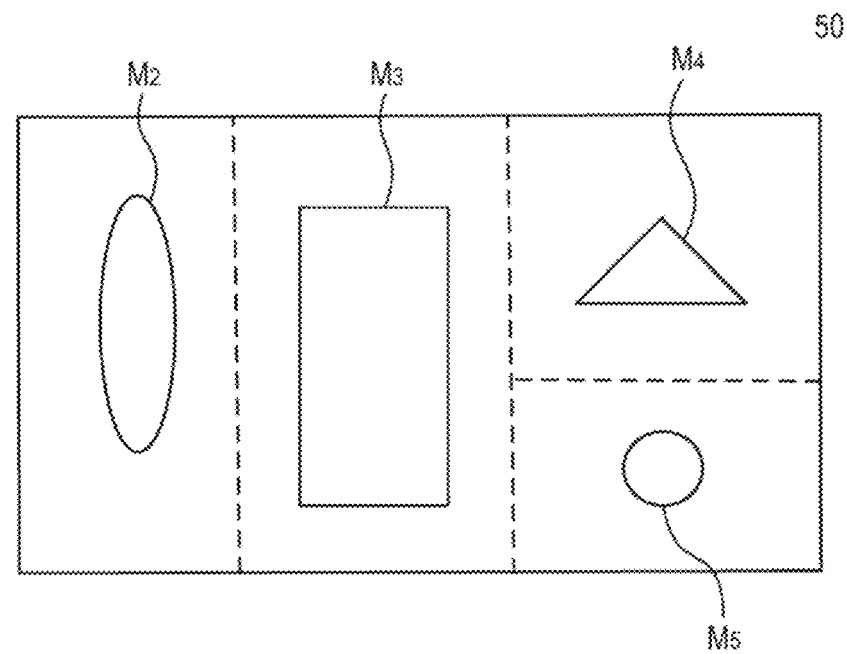
FIG. 15 illustrates a further example of how slice images are formed on a recording medium.

For another example, as shown in FIG. 15, in manufacturing 3D modeled objects of plural 3D models that are represented by different 3D data, plane assignment may be done so that slice images $M_2$ to $M_5$ corresponding to slice data of the plural kinds of 3D data will be formed on the same recording medium 50. In this case, plural kinds of 3D modeled products represented by the different 3D data are manufactured at the same time.

In the plane assignment shown in FIG. 15, the slice images $M_2$ to $M_5$ to be formed on the same recording medium 50 may be different from each other in at least one of shape and size. In this case, the number of recording media 50 can be reduced by doing plane assignment so as to minimize blank portions in plane-assigned slice images.

Although in the exemplary embodiment the information processing apparatus 10 generates plane-assigned slice image data by assigning plural pieces of slice data to planes, the invention is not limited to this case. For example, the image forming apparatus 12 may acquire plural pieces of slice data and perform image formation in a state that sets of slice images corresponding to the acquired plural pieces of slice data are assigned to planes.

(Modifications)

In the exemplary embodiment, components of a 3D modeled object (hereinafter referred to as "modeled components $P_n$") are manufactured in units of a slice data group. The manufactured modeled components $P_n$ of the 3D modeled object are not bonded to each other. The manufactured modeled components $P_n$ of the 3D modeled object may be bonded to each other by a user. In view of this, in a modification, positioning marks PM are formed additionally on side surfaces of each modeled component $P_n$ so that the modeled components $P_n$ can be bonded to each other being placed at correct positions.

Figure 16A:
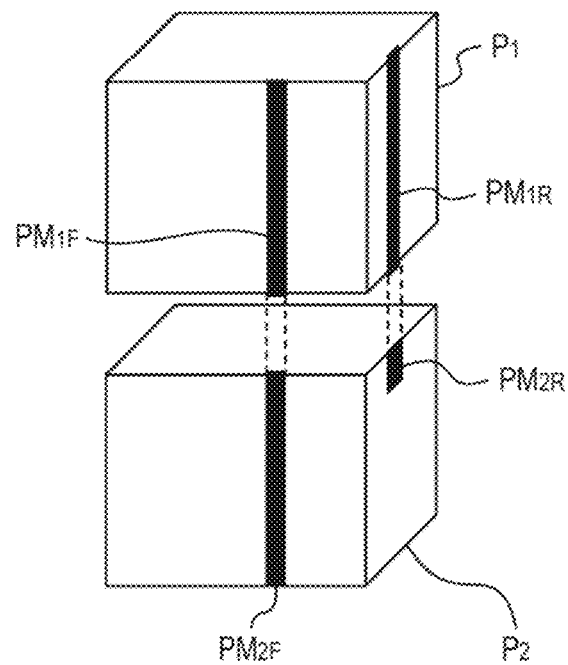
FIG. 16A is a schematic diagram illustrating a modification of the exemplary embodiment.
Figure 16B:
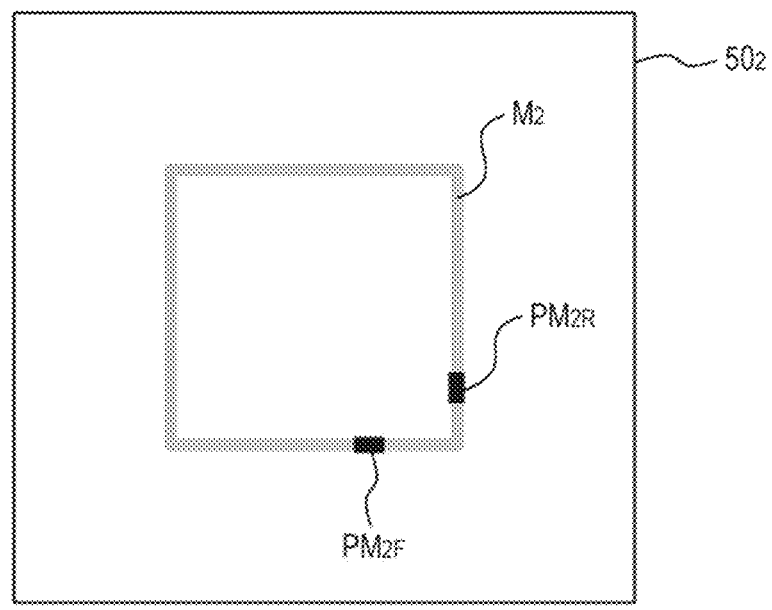
FIG. 16B is another schematic diagram illustrating the modification of the exemplary embodiment.

FIGS. 16A and 16B are schematic diagrams illustrating the modification of the exemplary embodiment. Modeled component $P_1$ and $P_2$ to become portions of a 3D modeled object P are generated as shown in FIG. 16A. Band-like positioning marks PM are formed on side surfaces of the modeled components $P_1$ and $P_2$ so as to span the modeled component $P_1$ and $P_2$.

A positioning mark $PM_{1F}$ formed on the modeled component $P_1$ is to be connected to a positioning mark $PM_{2F}$ formed on the modeled component $P_2$. A positioning mark $PM_{1R}$ formed on the modeled component $P_1$ is to be connected to a positioning mark $PM_{2R}$ formed on the modeled component $P_2$. The modeled components $P_1$ and $P_2$ are bonded to each other being placed at correct positions because they are positioned with respect to each other at two different, positions.

The numbers and the shapes of positioning marks PM are not limited to those shown in FIGS. 16A and 16B. Only one positioning mark PM may be formed for each modeled component $P_n$. In this case, two modeled components $P_n$ are positioned with respect to each other at one position. It suffices that each positioning mark PM be formed at an end portion for bonding; that is, each positioning mark PM need not be formed so as to extend in the lamination direction.

As shown in FIG. 16B, images of positioning marks PM are combined with portions of slice images $M_n$ when a series of slice image data is divided. In this example, parts of a colored portion of a slice image $M_2$ to be formed on a recording medium $50_2$ to become portions of the modeled component $P_2$ are replaced by positioning marks $PM_{2F}$ and $PM_{2R}$. The positioning marks $PM_{2F}$ and $PM_{2R}$ are portions, seen from the outside, of the modeled component $P_2$.

Where partial image forming operations and post-processing operations are performed by changing the order of the slice data groups, plural modeling components $P_n$ are manufactured in order that is different from the original order. Even in this case, a 3D modeled object P can be manufactured as a complete object by combining the plural modeling components $P_n$ with each other using positioning parks PM.

The above-described information processing apparatus, image forming apparatus, and program according to the exemplary embodiment are just examples, and it goes without saying that they can be modified without departing from the spirit and scope of the invention.

What is claimed is:

1. An information processing apparatus comprising:
a generation unit that generates plural pieces of slice data for sheet lamination 3D modeling by slicing, by plural planes, a 3D model as represented by 3D data;
a setting unit that sets a plane assignment policy, the plane assignment policy comprising a first policy that the number of recording media used should be made small, wherein if the plane assignment policy is set to the first policy, the generation unit generates plural pieces of slice data with a lamination direction set to a direction in which the number of pieces of slice data is minimized among plural predetermined, different directions;
a plane assignment unit that assigns slice images to planes so that slice images corresponding to a part of the plural pieces of slice data and slice images corresponding to another part of the plural pieces of slice data are to be formed on same set of recording media, wherein the plane assignment unit assigns the slice images to planes so that sets of slice images corresponding to sets of slice data of plural different series of 3D data are to be formed on the same set of recording media, and the plane assignment unit assigns the slice images to planes with a lamination direction that conforms to the plane assignment policy set by the setting unit; and
an output unit that generates, according to the plane assignment, image formation information that allows an image forming apparatus to form the slice images on recording media and outputs the generated image formation information to the image forming apparatus, and generates, according to the plane assignment, control data that allow a post-processing apparatus to perform post-processing for manufacture of a 3D modeled object and outputs the generated control data to the post-processing apparatus.

2. The information processing apparatus according to claim 1, wherein the plane assignment unit assigns the slice images to planes so that sets of slice images corresponding to pieces of slice data of a single series of 3D data are to be formed on the same set of recording media.

3. The information processing apparatus according to claim 1, further comprising a division unit that divides the plural pieces of slice data generated by slicing the 3D model by the plural planes into plural slice data groups,
wherein the plane assignment unit assigns the slice images to planes so that slice images corresponding to one of the plural slice data groups and slice images corresponding to another of the plural slice data groups are to be formed on the same set of recording media.

4. The information processing apparatus according to claim 2, further comprising a division unit that divides the plural pieces of slice data generated by slicing the 3D model by the plural planes into plural slice data groups,
wherein the plane assignment unit assigns the slice images to planes so that slice images corresponding to one of the plural slice data groups and slice images corresponding to another of the plural slice data groups are to be formed on the same set of recording media.

5. The information processing apparatus according to claim 3, wherein the division unit divides the plural pieces of slice data into the plural slice data groups in such a manner that the plural slice data groups include the same number of pieces of slice data.

6. The information processing apparatus according to claim 1, wherein the plane assignment unit assigns the slice images to planes so that slice images that are different from each other in at least one of shape and size are to be formed on the same recording medium.

7. The information processing apparatus according to claim 2, wherein the plane assignment unit assigns the slice images to planes so that slice images that are different from each other in at least one of shape and size are to be formed on the same recording medium.

8. The information processing apparatus according to claim 2, further comprising a setting unit that sets a plane assignment policy,
wherein the plane assignment unit assigns the slice images to planes with a lamination direction that conforms to the plane assignment policy set by the setting unit.

9. An information processing apparatus comprising:
a generation unit that generates plural pieces of slice data for sheet lamination 3D modeling by slicing, by plural planes, a 3D model as represented by 3D data;
a setting unit that sets a plane assignment policy, the plane assignment policy comprising a second policy that many 3D modeled objects should be manufactured at one time, wherein if the plane assignment policy is set to the second policy, the generation unit generates plural pieces of slice data with a lamination direction set to a direction that provides a smallest one of maximum values of sectional areas of the plural pieces of slice data among plural predetermined, different directions;
a plane assignment unit that assigns slice images to planes so that slice images corresponding to a part of the plural pieces of slice data and slice images corresponding to another part of the plural pieces of slice data are to be formed on same set of recording media, wherein the plane assignment unit assigns the slice images to planes so that sets of slice images corresponding to sets of slice data of plural different series of 3D data are to be formed on the same set of recording media, and the plane assignment unit assigns the slice images to planes with a lamination direction that conforms to the plane assignment policy set by the setting unit; and
an output unit that generates, according to the plane assignment, image formation information that allows an image forming apparatus to form the slice images on recording media and outputs the generated image formation information to the image forming apparatus, and generates, according to the plane assignment, control data that allow a post-processing apparatus to perform post-processing for manufacture of a 3D modeled object and outputs the generated control data to the post-processing apparatus.

10. The information processing apparatus according to claim 1, wherein:
the plane assignment policy comprises a second policy that many 3D modeled objects should be manufactured at one time; and
if the plane assignment policy is set to the second policy, the generation unit generates plural pieces of slice data with a lamination direction set to a direction that provides a smallest one of maximum values of sectional areas of the plural pieces of slice data among plural predetermined, different directions.

11. A 3D modeling system comprising:
the information processing apparatus according to claim 1;
an image forming apparatus that forms images on respective recording media on the basis of image formation information generated by the information processing apparatus; and
a post-processing apparatus that performs post-processing for manufacture of a 3D modeled object on recording media on which respective slice images have been formed by the image forming apparatus, according to control data that have been generated by the information processing apparatus so as to correspond to the slice images.

12. A non-transitory computer readable medium storing a program for causing a computer to function as:
a generation unit that generates plural pieces of slice data for sheet lamination 3D modeling by slicing, by plural planes, a 3D model as represented by 3D data;
a setting unit that sets a plane assignment policy, the plane assignment policy comprising a first policy that the number of recording media used should be made small, wherein if the plane assignment policy is set to the first policy, the generation unit generates plural pieces of slice data with a lamination direction set to a direction in which the number of pieces of slice data is minimized among plural predetermined, different directions;
a plane assignment unit that assigns slice images to planes so that slice images corresponding to a part of the plural pieces of slice data and slice images corresponding to another part of the plural pieces of slice data are to be formed on same set of recording media, wherein the plane assignment unit assigns the slice images to planes so that sets of slice images corresponding to sets of slice data of plural different series of 3D data are to be formed on the same set of recording media, and the plane assignment unit assigns the slice images to planes with a lamination direction that conforms to the plane assignment policy set by the setting unit; and
an output unit that generates, according to the plane assignment, image formation information that allows an image forming apparatus to form the slice images on recording media and outputs the generated image formation information to the image forming apparatus, and generates, according to the plane assignment, control data that allow a post-processing apparatus to perform post-processing for manufacture of a 3D modeled object and outputs the generated control data to the post-processing apparatus.

13. An information processing apparatus comprising:
a generation unit that generates plural pieces of slice data for sheet lamination 3D modeling by slicing, by plural planes, a 3D model as represented by 3D data;
a setting unit that sets a plane assignment policy, the plane assignment policy comprising a first policy that the number of recording media used should be made small, wherein if the plane assignment policy is set to the first policy, the generation unit generates plural pieces of slice data with a lamination direction set to a direction in which the number of pieces of slice data is minimized among plural predetermined, different directions;
a plane assignment unit that assigns slice images to planes so that slice images corresponding to a part of the plural pieces of slice data and slice images corresponding to another part of the plural pieces of slice data are to be formed on same set of recording media, and the plane assignment unit assigns the slice images to planes with a lamination direction that conforms to the plane assignment policy set by the setting unit;
an output unit that generates, according to the plane assignment, image formation information that allows an image forming apparatus to form the slice images on recording media and outputs the generated image formation information to the image forming apparatus, and generates, according to the plane assignment, control data that allow a post-processing apparatus to perform post-processing for manufacture of a 3D modeled object and outputs the generated control data to the post-processing apparatus; and a division unit that divides the plural pieces of slice data generated by slicing the 3D model by the plural planes into plural slice data groups;

wherein the plane assignment unit assigns the slice images to planes so that slice images corresponding to one of the plural slice data groups and slice images corresponding to another of the plural slice data groups are to be formed on the same set of recording media;

wherein the plural slice data groups are correlated with each other using unique identification information assigned to each of the plural slice data groups to facilitate post-processing.

* * * * *